United States Patent
Chong et al.

(10) Patent No.: US 10,208,969 B2
(45) Date of Patent: Feb. 19, 2019

(54) APPARATUS FOR BOTH HUMIDIFICATION AND AIR CLEANING

(71) Applicant: LG ELECTRONICS INC., Seoul (KR)

(72) Inventors: Chungook Chong, Seoul (KR); Jieun Choi, Seoul (KR); Sanghyuk Son, Seoul (KR); Jungwoo Lee, Seoul (KR); Taeyoon Kim, Seoul (KR); Younggu Lee, Seoul (KR); Kunyoung Lee, Seoul (KR); Hyuckju Kwon, Seoul (KR); Jongsu Lee, Seoul (KR); Kyoungho Lee, Seoul (KR); Unchang Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 15/337,304

(22) Filed: Oct. 28, 2016

(65) Prior Publication Data

US 2017/0122582 A1    May 4, 2017

Related U.S. Application Data

(60) Provisional application No. 62/355,118, filed on Jun. 27, 2016, provisional application No. 62/248,463, filed on Oct. 30, 2015.

(30) Foreign Application Priority Data

| Nov. 7, 2015 | (KR) | 10-2015-0156254 |
| Nov. 7, 2015 | (KR) | 10-2015-0156255 |

(Continued)

(51) Int. Cl.
*B01F 3/04* (2006.01)
*F24F 6/04* (2006.01)
(Continued)

(52) U.S. Cl.
CPC ............. *F24F 6/04* (2013.01); *B01D 46/10* (2013.01); *B01F 3/04035* (2013.01);
(Continued)

(58) Field of Classification Search
CPC ..... B01F 3/04; B01F 3/04007; B01F 3/04028; B01F 3/04035; B01F 3/04042
(Continued)

(56) References Cited

U.S. PATENT DOCUMENTS

| RE20,341 E | * | 4/1937 | Lea ................. F24F 6/06 |
| | | | 261/100 |
| 5,213,595 A | | 5/1993 | Kim |
| 2006/0102001 A1 | | 5/2006 | Shin |

FOREIGN PATENT DOCUMENTS

| JP | 9-267014 A | 10/1997 |
| JP | 11-024759 A | 1/1999 |

(Continued)

*Primary Examiner* — Robert A Hopkins
(74) *Attorney, Agent, or Firm* — Dentons US LLP

(57) ABSTRACT

Provided is a humidification and air cleaning apparatus. The humidification and air cleaning apparatus includes: a water tank storing water; a watering housing disposed inside the water tank, suctioning water of the water tank thereinto, pumping the suctioned water to an upper side when rotating, and spraying the pumped water; a watering motor providing a torque to the watering housing; and a power transmission shaft disposed inside the watering housing, connecting the watering motor and the watering housing, and delivering a torque of the watering motor to the watering housing.

14 Claims, 35 Drawing Sheets

(30) Foreign Application Priority Data

| Dec. 24, 2015 | (KR) | 10-2015-0185876 |
|---|---|---|
| Mar. 28, 2016 | (KR) | 10-2016-0037235 |
| Jun. 30, 2016 | (KR) | 10-2016-0083053 |
| Oct. 6, 2016 | (KR) | 10-2016-0129316 |

(51) Int. Cl.
*F24F 6/16* (2006.01)
*B01D 46/10* (2006.01)
*F24F 13/20* (2006.01)
*F24F 13/28* (2006.01)
*F24F 6/00* (2006.01)

(52) U.S. Cl.
CPC ............ *B01F 3/04042* (2013.01); *F24F 6/16* (2013.01); *F24F 13/20* (2013.01); *F24F 13/28* (2013.01); *B01D 2279/50* (2013.01); *F24F 2006/008* (2013.01); *F24F 2006/046* (2013.01)

(58) Field of Classification Search
USPC .............................................. 261/83, 85, 88
See application file for complete search history.

(56) References Cited

FOREIGN PATENT DOCUMENTS

| JP | 2003-307327 A | 10/2003 |
|---|---|---|
| JP | 2008-082683 A | 4/2008 |
| JP | 2012-233654 A | 11/2012 |
| JP | 2015-059671 A | 3/2015 |
| KR | 20-0132123 Y1 | 1/1999 |
| KR | 10-2006-0055006 A | 5/2006 |
| KR | 10-2013-0064222 A | 6/2013 |
| KR | 10-1335221 B1 | 11/2013 |
| WO | 2014/019434 A1 | 2/2014 |

\* cited by examiner

APPARATUS FOR BOTH HUMIDIFICATION AND AIR CLEANING

CROSS-REFERENCE TO RELATED APPLICATIONS

This U.S. non-provisional patent application claims priority to and benefit of U.S. Provisional Application Nos. 62/248,463 filed Oct. 30, 2015, and 62/355,118 filed Jun. 27, 2016, Korean Patent Application Nos. 10-2015-0156254 filed Nov. 7, 2015, 10-2015-0156255 filed Nov. 7, 2015, 10-2015-0185876 filed Dec. 24, 2015, 10-2016-0037235 filed Mar. 28, 2016, 10-2016-0083053 filed Jun. 30, 2016, and 10-2016-0129316 filed Oct. 6, 2016, all of which are hereby incorporated by reference in their entirety.

BACKGROUND OF THE INVENTION

The present invention disclosed herein relates to an apparatus for both humidification and air cleaning.

Air conditioning apparatuses include air conditioners that control the temperature of air, air cleaners that remove foreign substances from air to maintain air cleanliness, humidifiers that increase humidity in the air, and dehumidifiers that reduce humidity in the air.

Typical humidifiers are classified into a vibration type which atomizes water on a vibrating plate and discharges atomized water into air and a natural evaporation type that naturally evaporates water in a humidification filter.

The natural evaporation type of humidifier is classified into a disc type of humidifier which rotates a disc using a driving force and allows water to naturally evaporate from the surface of the disc in the air and a humidification filter type of humidifier which allows water to naturally evaporate from a wet humidification medium by flowing air.

In a typical humidifier, a portion of flowing air during the humidification process is filtered by a filter. However, since the main function of a typical humidifier is a humidification function, its air cleaning function is weak.

Also, since a typical humidifier has a structure in which the humidification process is performed by adding a filtration function, a typical humidifier cannot be operated only for air filtration.

Accordingly, even in a situation where humidity is high, a typical humidifier inevitably performs humidification even though a user desires air cleaning.

SUMMARY OF THE INVENTION

The present invention provides a humidification and air cleaning apparatus which can separately operate a humidification function and an air cleaning function.

The present invention also provides a humidification and air cleaning apparatus which includes a separable power transmission module disposed therein.

The present invention also provides a humidification and air cleaning apparatus which includes a watering housing disposed in a water tank and a watering motor disposed in a base body, and provides a torque of the watering motor to the watering housing.

The present invention also provides a humidification and air cleaning apparatus which can deliver a torque through separable couplers.

The present invention also provides a humidification and air cleaning apparatus which can minimize vibration and eccentricity when a power transmission shaft is lengthily disposed in a longitudinal direction.

The present invention also provides a humidification and air cleaning apparatus which includes a second coupler disposed at an outer lower side of a water tank to receive a torque, and rotates a watering housing through a power transmission shaft coupled to the second coupler.

The objectives of the present invention are not limited to the above-mentioned objectives, and other objectives that are not mentioned will be clearly understood by persons skilled in the art from the following description.

Embodiments of the present invention provide humidification and air cleaning apparatuses including: a water tank storing water; a watering housing disposed inside the water tank, suctioning water of the water tank thereinto, pumping the suctioned water to an upper side when rotating, and spraying the pumped water; a watering motor providing a torque to the watering housing; and a power transmission shaft disposed inside the watering housing, connecting the watering motor and the watering housing, and delivering a torque of the watering motor to the watering housing.

In some embodiments, the watering motor may be disposed under the water tank, and the power transmission shaft may penetrate a bottom of the water tank to be connected to the watering housing.

In some embodiments, the watering housing may further includes a watering connection part disposed inside therein and protruding inward, wherein the power transmission shaft is coupled to the watering connection part to deliver a torque.

In some embodiments, the humidification and air cleaning apparatus may further include a bushing installed at the power transmission shaft power transmission shaft, wherein the bushing is formed of a metallic material.

In some embodiments, the bushing may be located higher than a full water level of the water tank.

In some embodiments, the water tank may further include a column disposed inside the watering housing. The column may upwardly protrude inside the watering housing, and the power transmission shaft may penetrate the column to be coupled to the watering housing.

In some embodiments, the humidification and air cleaning apparatus may further include a power transmission housing disposed inside the column, wherein: the power transmission housing is supported inside the column; the power transmission housing has a hollow that the power transmission shaft penetrates; and the power transmission shaft penetrates the power transmission housing and the column to be coupled to the watering housing.

In some embodiments, the humidification and air cleaning apparatus may further include a bearing disposed inside the power transmission housing, wherein the power transmission shaft penetrates the bearing.

In some embodiments, the humidification and air cleaning apparatus may further include a shaft gasket disposed inside the power transmission housing, wherein the shaft gasket seals the hollow, and the power transmission shaft penetrates the shaft gasket.

In some embodiments, the power transmission housing may be coupled and fixed to the water tank.

In some embodiments, the watering housing may include: a first watering housing spaced from a undersurface of an inner side of the water tank by a suction gap and having upper and a lower sides thereof opened, respectively; a second watering housing having upper and lower sides opened, assembled with an upper end of the first watering housing, and communicating with the inside of the first watering housing; a watering housing cover coupled with an upper end of the second watering housing and covering an upper surface of the second watering housing; and a power transmission unit disposed in at least one of the first watering housing, the second watering housing and the watering housing cover and receiving a torque from the watering motor, and the power transmission shaft may be coupled to the power transmission unit.

In some embodiments, the power transmission shaft may have an upper end thereof coupled to the watering housing cover.

In some embodiments, the humidification and air cleaning apparatus may further include a bushing installed at the power transmission unit, wherein the power transmission shaft penetrates the bushing to be coupled, and the power transmission shaft has an upper end thereof coupled to the watering housing cover.

In some embodiments, the humidification and air cleaning apparatus may further include a column upwardly protruding from a bottom of the water tank, wherein the power transmission shaft penetrates the column to be coupled to the watering housing, and the column is disposed under the power transmission unit.

In some embodiments, the humidification and air cleaning apparatus may further include a power transmission housing disposed inside the column, wherein the power transmission housing includes: a bearing housing having upper and lower sides thereof opened; a housing cap coupled to an upper side of the bearing housing and allowing the power transmission shaft to penetrate therethrough in a vertical direction; a shaft gasket disposed between the housing cap and the power transmission shaft and fitted into and fixed to the housing cap; and a housing elastic member disposed between the bearing housing and the housing cap to provide an elastic force.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
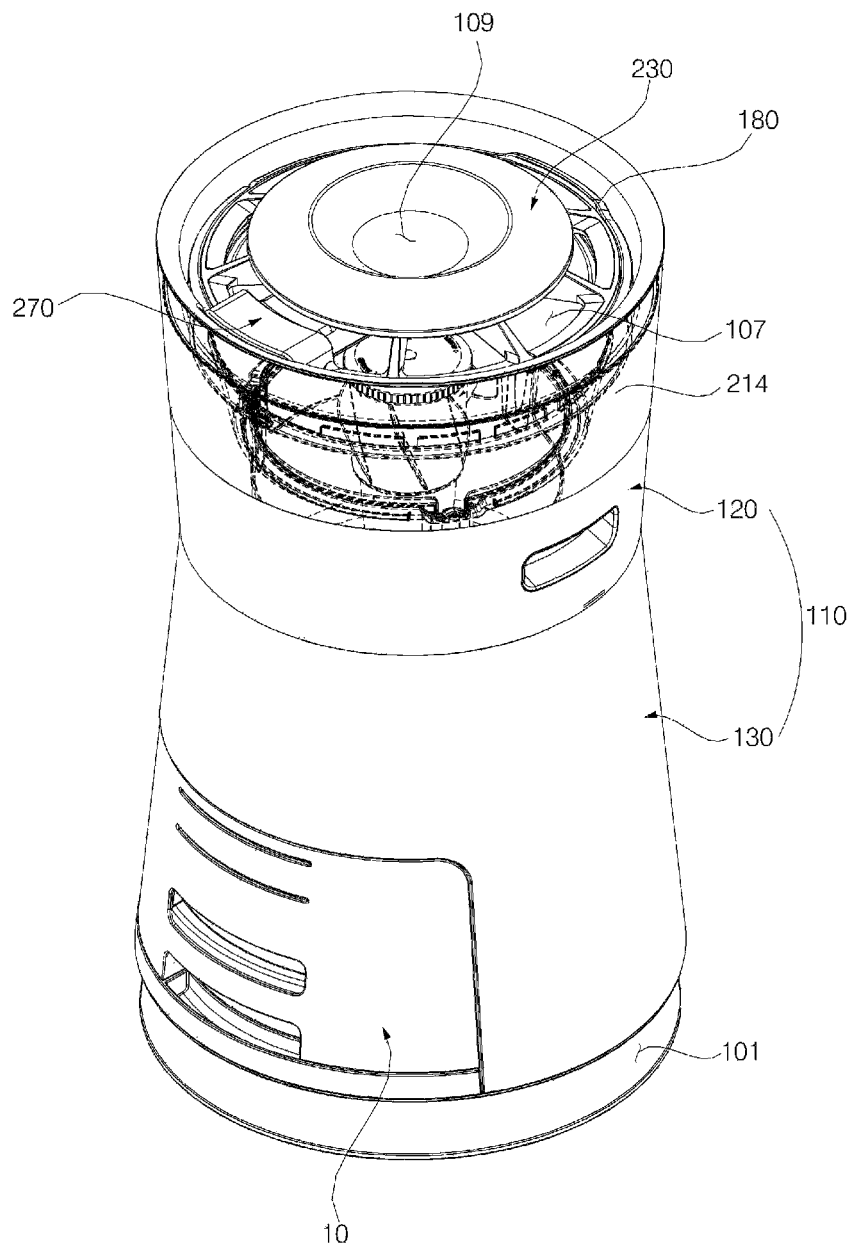
FIG. 1 is a perspective view illustrating a humidification and air cleaning apparatus according to a first embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Hereinafter, exemplary embodiments of the present invention will be described in detail with reference to the accompanying drawings.

Figure 2:
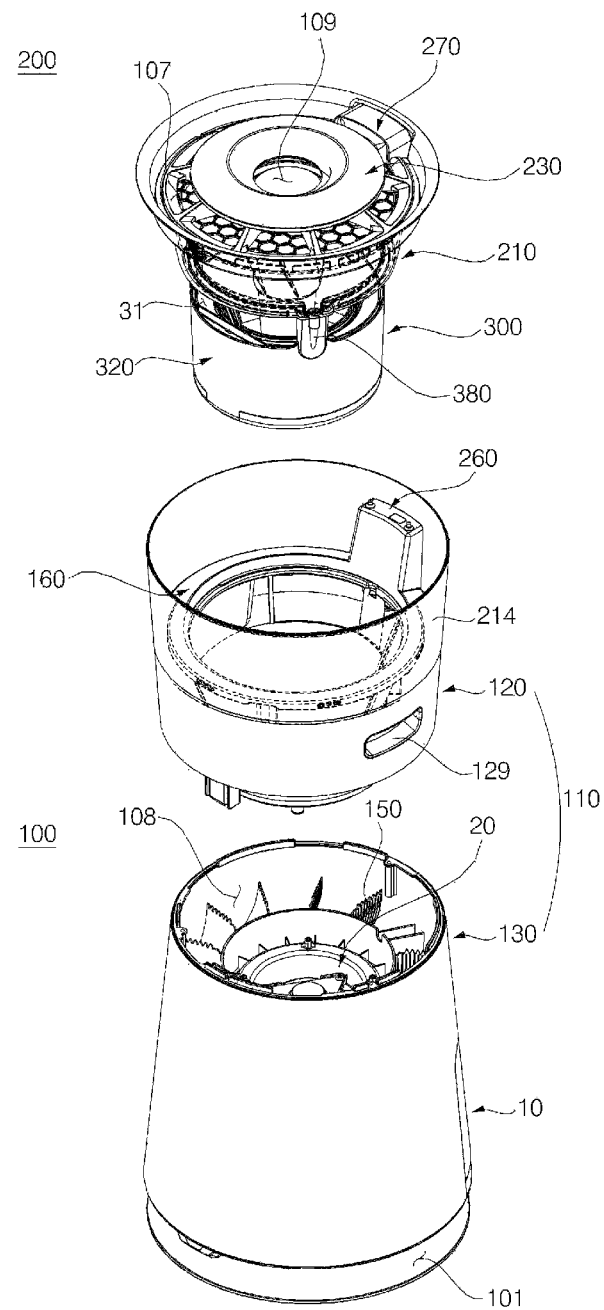
FIG. 2 is an exploded perspective view of FIG. 1.
Figure 3:
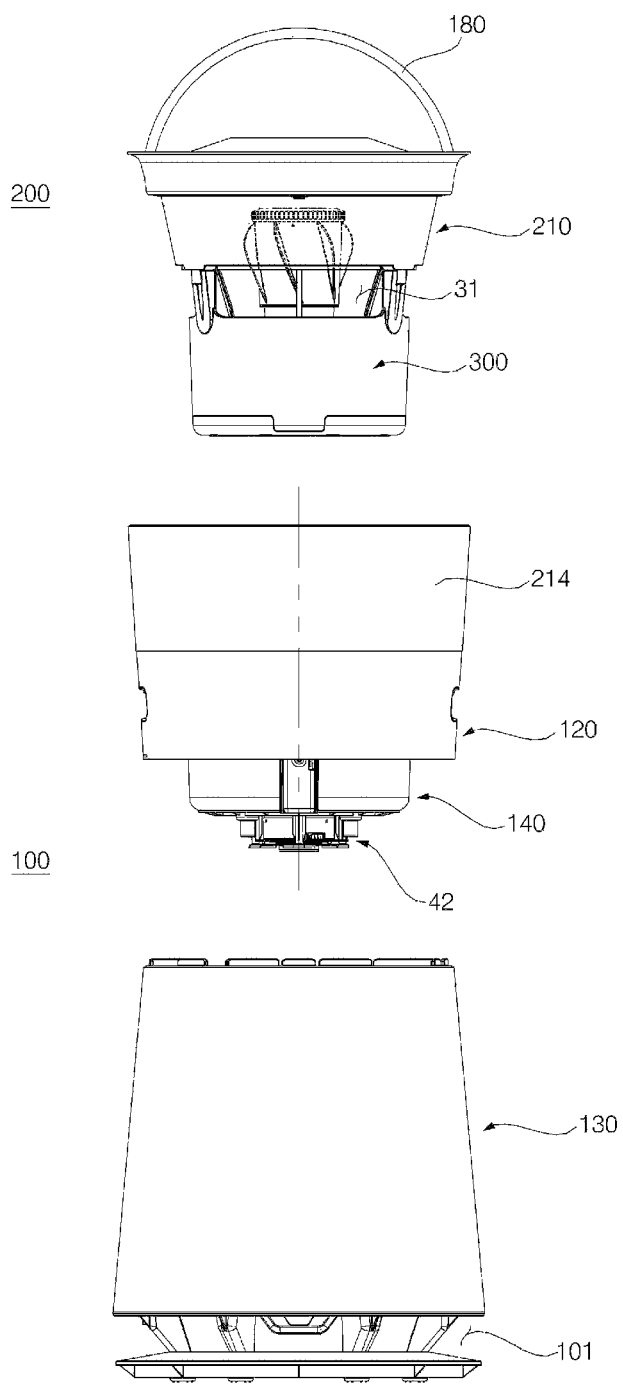
FIG. 3 is an exploded front view of FIG. 1.
Figure 4:
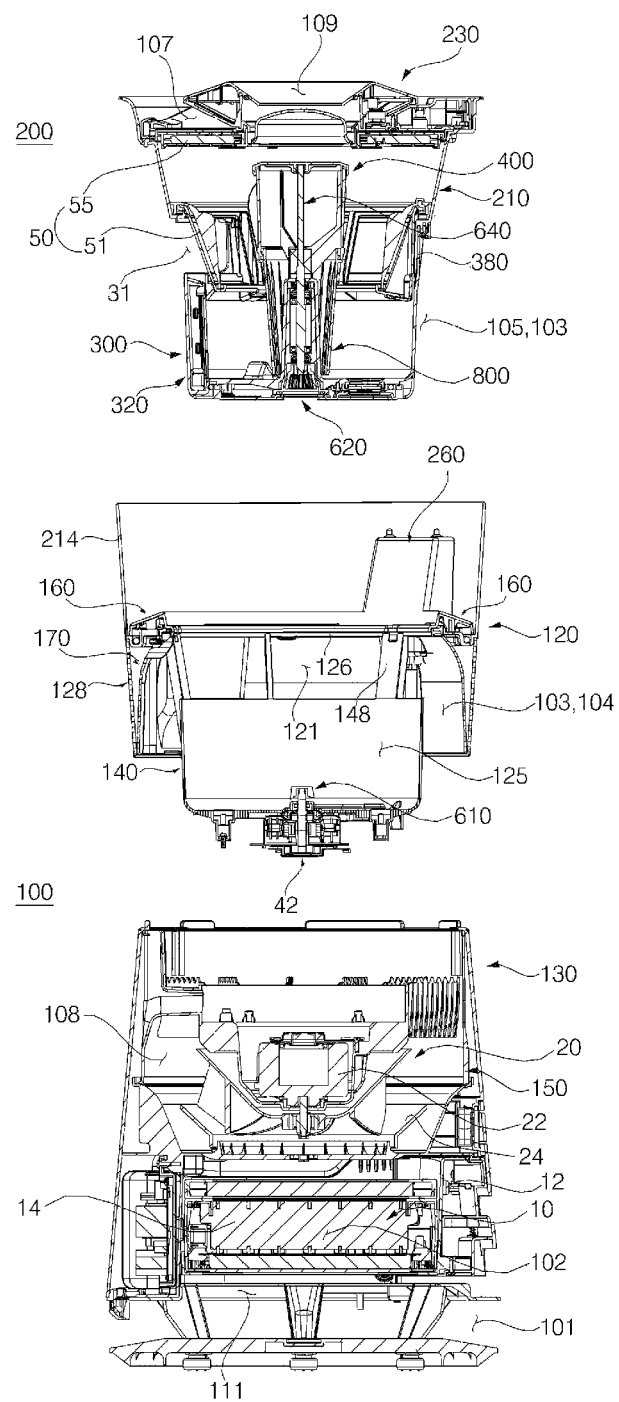
FIG. 4 is an exploded cross-sectional view of FIG. 3.
Figure 5:
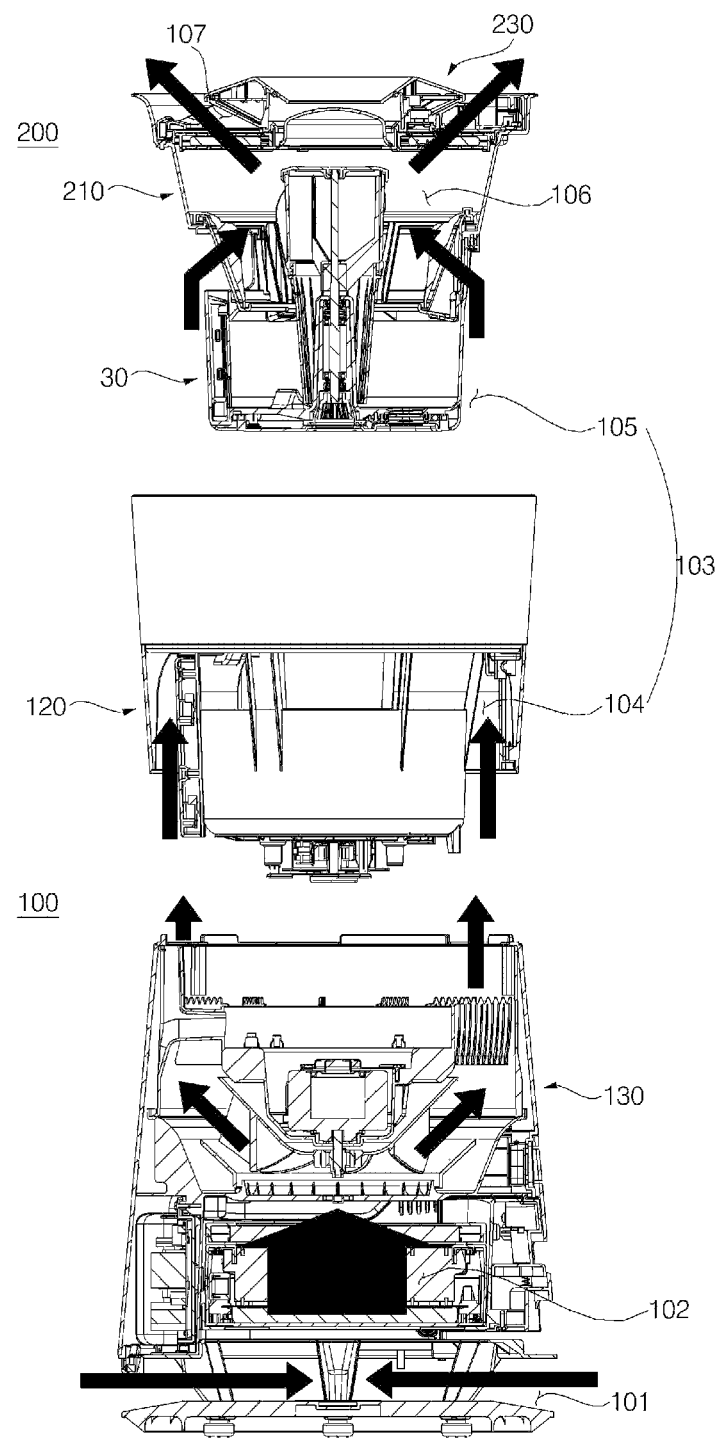
FIG. 5 is a view illustrating an air flow of the humidification and air cleaning apparatus according to the first embodiment of the present invention.

FIG. 1 is a perspective view illustrating a humidification and air cleaning apparatus according to a first embodiment of the present invention. FIG. 2 is an exploded perspective view of FIG. 1. FIG. 3 is an exploded front view of FIG. 1. FIG. 4 is an exploded cross-sectional view of FIG. 3. FIG.

5 is a view illustrating an air flow of the humidification and air cleaning apparatus according to the first embodiment of the present invention.

A humidification and air cleaning apparatus according to an embodiment of the present invention may include an air clean module 100 and an air wash module 200 disposed over the air clean module 100.

The air clean module 100 may take in and filter external air, and may provide filtered air to the air wash module 200. The air wash module 200 may be supplied with filtered air, may perform humidification to provide moisture, and may discharge humidified air to the outside.

The air wash module 200 may include a water tank 30 for storing water. The water tank 30 may be separable from the air clean module 100 when the air wash module 200 is separated. The air wash module 200 may be disposed over the air clean module 100.

A user can separate the air wash module 200 from the air clean module 100, and can clean the air wash module 200 that is separated. A user may also clean the inside of the air clean module 100 from which the air wash module 200 is separated. When the air wash module 200 is separated, the upper surface of the air clean module 100 may be opened to a user. The air clean module 100 may be cleaned after a filter assembly 10 described later is separated.

A user may supply water into the air wash module 200. The air wash module 200 may have a water supply flow passage 109 formed therein to supply water from the outside to the water tank 30.

The water supply flow passage 109 may be configured to supply water into the water tank 30 at any moment. For example, even when the air wash module 200 is operating, water can be supplied through the water supply flow passage. For example, even when the air wash module 200 is coupled to the air clean module 100, water can be supplied through the water supply flow passage. For example, even when the air wash module 200 is decoupled from the air clean module 100, water can be supplied through the water supply flow passage.

The air clean module 100 and the air wash module 200 may be connected to each other through a connection flow passage 103. Since the air wash module 200 is separable, the connection flow passage 103 may be distributedly formed at the air clean module 100 and the air wash module 200.

The connection flow passage formed in the air clean module 100 may be defined as a clean connection flow passage 104, and the connection flow passage formed in the air wash module 200 may be defined as a humidification connection flow passage 105. When the air wash module 200 is placed on the air clean module 100, the connection flow passage is connected, and the flow passage of air may be accurately configured.

The flow of air passing through the air clean module 100 and the air wash module 200 will be described in more detail later.

Hereinafter, a configuration of the air clean module 100 will be described in more detail.

The air clean module 100 may include a base body 110 having an intake flow passage 101 and a clean connection flow passage 104 formed therein, a filter assembly 10 that is separably disposed in the base body 110 and filters flowing air, and an air blowing unit 20 that is disposed inside the base body 110 and allows air to flow.

External air may be entered into the base body through the intake flow passage 101. Filtered air in the filter assembly 10 may be provided to the air wash module 200 through the clean connection flow passage 104.

In this embodiment, the base body 110 may be configured to have two parts.

The base body 110 may include the lower body 130 defining the exterior thereof and having an inlet hole 110 formed in the undersurface thereof, and the upper body 120 defining the exterior thereof and coupled to the upper side of the lower body 130.

A display module 160 may be disposed in at least one of the air clean module 100 or the air wash module 200 to display the operational state to a user. In this embodiment, the display module 160 may be disposed in the base body 110 to display the operational state of the humidification and air cleaning apparatus to a user.

The upper body 120 and the lower body 130 may be assembled into one body. Unlike this embodiment, the upper body 120 and the lower body 130 may be integrally manufactured.

The air wash module 200 may be separably placed on the upper body 120, and the load of the air wash module 200 may be supported by the upper body 120.

The upper body 120 may provide a structure on which the water tank 30 can be stably placed. The upper body 120 may have a structure from which the water tank 30 of the air wash module 200 is separable. The upper body 120 may have a concave structure so as to receive the water tank 30.

The upper body 120 may be concavely formed toward the inside of the base body, and may receive the water tank 30. Thus, the center of gravity of the humidification and air cleaning apparatus can be moved to a lower side.

The humidification and air cleaning apparatus according to this embodiment may be supplied with power through the air clean module 100, and may provide power to the air wash module 200 through the air clean module 100. Since the air wash module 200 has a structure separable from the air clean module 100, the air clean module 100 and the air wash module 200 may be provided with a separable power supply structure.

Since the air clean module 100 and the air wash module 200 are assembled through the upper body 120, a connector 260 may be disposed in the upper body 120 to provide power for the air wash module 200. A top connector 270 may be disposed in the top cover assembly 230, and may be separably connected to the connector 260. When the top cover assembly 230 is placed, the top connector 270 may be disposed over the connector 260. The top cover assembly 230 may be supplied with electricity from the connector 260 via the top connector 270.

The filter assembly 10 may be detachably assembled with the base body 110.

The filter assembly 10 may provide the filtering flow passage 102, and may filter external air.

The filter assembly 10 may have a structure that is detachable from the base body 110 in a horizontal direction. The filter assembly 10 may be disposed so as to cross the flowing direction of air that flows upstream in a vertical direction. The filter assembly 10 may be disposed in a horizontal direction that orthogonally crosses the direction of air flowing from a lower side to an upper side.

The filter assembly 10 may slide in a horizontal direction with respect to the base body 110.

The air blowing unit 20 may generate flowing of air. The air blowing unit 20 may be disposed inside the base body 110, and may allow air to flow from the lower side to the upper side.

The air blowing unit 20 may include a blower housing 150, a blower motor 22, and a blower fan 24. In this embodiment, the blower motor 22 may be disposed at an upper side, and the blower fan 24 may be disposed at a lower side.

The blower housing 150 may be disposed inside the base body 110. The blower housing 150 may provide a flow passage of flowing air. The blower motor 22 and the blower fan 24 may be disposed in the blower housing 150.

The blower housing 150 may be disposed over the filter assembly 10, and may be disposed under the upper body 120.

The blower fan 24 may be a centrifugal fan, and may blow air from the lower side thereof and discharge air to the outside in a radial direction. The blower fan 24 may discharge air to the upper side and the outside in a radial direction. The outer end of the blower fan 24 may be disposed to direct to the upper side in a radial direction.

The blower motor 22 may be disposed over the blower fan 24 to minimize contact with flowing air. The blower motor 22 may not be located on the airflow passage by the blower fan 24.

The air wash module 200 may include a water tank 30, a watering unit 40, a humidification medium 50, a visual body 210, and a top cover assembly 230. The water tank 30 may store water for humidification, and may be detachably disposed over the air clean module 100. The watering unit 40 may be disposed in the water tank 30, and may spray water in the water tank 30. The humidification medium 50 may be wetted with water sprayed from the watering unit 40, and may provide moisture to flowing air. The visual body 210 may be coupled to the water tank 30, and may be formed of a transparent material. The top cover assembly 230 may be detachably disposed over the visual body 210, and may include a discharge flow passage 107 through which air is discharged and a water supply flow passage 109 through which water is supplied.

The water tank 30 may be placed in the upper body 120. The watering unit 40 may be disposed inside the water tank 30, and may rotate inside the water tank 30.

The watering unit 40 may draw water of the water tank, and may pump water drawn water to an upper side. The watering unit 40 may spray pumped water in a radial direction. The watering unit 40 may include the watering housing 800 that draws water, upwardly pumps drawn water, and then sprays pumped water toward the outside in a radial direction.

Water sprayed from the watering housing 800 may wet the humidification medium 50. Water sprayed from the watering housing 800 may be sprayed toward at least one of the visual body 210 and the humidification medium 50.

In this embodiment, the watering housing 800 may spray water to the inner side surface of the visual body 210, and sprayed water may flow down along the inner side surface of the visual body 210. Droplets formed in a form of water drop may be formed on the inner side surface of the visual body 210, and a user can see droplets through the visual body 210.

The visual body 210 may be coupled to the water tank 30, and may be located over the water tank 30. At least a portion of visual body 210 may be formed of a material through which a user can see the inside.

Droplets formed on the inner side surface of the visual body 210 may implement a form of raindrops. Droplets flowing down from the visual body 210 may wet the humidification medium. 50.

A display module 160 may be disposed outside the visual body 210. The display module 160 may be coupled to any one of the visual body 210 and the upper body 120. In this embodiment, the display module 160 may be disposed at the upper body 120.

When the air wash module 200 is placed, the outer surface of the visual body 210 may adhere closely to the display module 160. At least a portion of the surface of the display module 160 may be formed of a material that reflects light.

Droplets formed on the visual body 210 may also be projected onto the surface of the display module 160. Accordingly, a user can observe the motion of droplets at both visual body 210 and display module 160.

The water tank 30 may include a water tank inlet 31 to allow air to pass therethrough. Air supplied from the air clean module 100 may flow into the air wash module 200 through the water tank inlet 31.

The humidification medium 50 may include a water tank humidification medium 51 disposed at the connection flow passage 103, and a discharge humidification medium 55 disposed at the discharge flow passage 107.

The water tank humidification medium 51 may be disposed on the connection flow passage 103 and in this embodiment, may be disposed at the water tank inlet 31 of the water tank 30. The water tank humidification medium 51 may be disposed inside the water tank inlet 31 and provide humidification on air passing through the water tank inlet 31.

The water tank humidification medium 51 may cover the water tank inlet 31, and air may penetrate the water tank humidification medium 51 to flow into the water tank 30.

The discharge humidification medium 55 may be disposed on the discharge flow passage 107. The discharge humidification medium 55 may be disposed on at least one of the visual body 21 or the top cover assembly 230. In this embodiment, the discharge humidification medium 55 may be disposed at the top cover assembly 230.

The discharge humidification medium 55 may cover the discharge flow passage 107, and air may penetrate the discharge humidification medium 55 to flow to the outside of the top cover assembly 230.

Hereinafter, the flow of air will be described with reference to the accompanying drawings.

When the air blowing unit 20 operates, external air may flow into the base body 110 through the intake flow passage 101 formed at a lower side of the base body 110. Air entered through the intake flow passage 101 may pass the air clean module 100 and the air wash module 200 while moving upward, and may be discharged to the outside through the discharge flow passage 107 formed at an upper side of the air wash module 200.

The air entered to the intake flow passage 101 may pass through the filtering flow passage 102 of the filter assembly 10. As the air passes through the filtering flow passage 102, the filter assembly 10 may filter external air.

Air passing the filtering flow passage 102 may flow to the connection flow passage through the air blowing unit 20. After the air passing through the filtering flow passage 102 is pressed by the blower fan 24, it flows to the connection flow passage 103 along the blower fan housing 150.

Since the air blowing unit 20 is disposed next to the filtering flow passage 102, adherence of foreign substances like dust on the blower fan 24 can be minimized.

If the air blowing unit 20 is disposed before the filtering flow passage 102, foreign substances may be attached to the blower fan 24, and due to this, a cleaning cycle may be shortened.

Also, since the air blowing unit 20 is disposed at the front of the humidification flow passage 106, adherence of moisture on the surface of the blower fan 24 can be minimized When moisture adheres to the surface of the blower fan 24, foreign substances may adhere to the surface of the blower fan 24 or molds may be likely to grow on the blower fan 24.

Since the air blowing unit 20 is disposed between the filtering flow passage 102 and the humidification flow passage 106, the adherence of foreign substances may be minimized and the flow pressure of air may be provided appropriately.

The connection flow passage 103 may include the clean connection flow passage 104 formed in the air clean module 100 and the humidification connection flow passage 105 formed in the air wash module 200.

When the air wash module 200 is placed on the upper body 120, the clean connection flow passage 104 and the humidification connection flow passage 105 may be connected to each other. When the air wash module 200 is in a separated state, the clean connection flow passage 104 and the humidification connection flow passage 105 may be exposed to the outside.

The clean connection flow passage 104 may be formed in the upper body 120, and the humidification connection flow passage 105 may be formed in the air wash module 200.

The clean connection flow passage 104 and the humidification connection flow passage 105 may also be formed in a form of duct to form a clear flow passage. In this embodiment, when the connection flow passage 103 is distributed as a partial structure of the upper body 120 and a partial structure of the water tank 30 and the air wash module 200 is mounted on the upper body 120, the connection flow passage 103 may be formed.

In this embodiment, the upper body 120 may provide the outer structure of the connection flow passage 103 and the water tank 30 may provide the inner structure of the connection flow passage 103.

That is, the connection flow passage 103 may be formed between the outside of the water tank 30 and the inside of the upper body 120. Therefore, the connection flow passage 103 may be formed between the water tank 30 and the upper body 120. The water tank 30 may form an inner wall of the connection flow passage 103 and the upper body 120 may form an outer wall of the connection flow passage 103.

In such a manner, the structure of the connection flow passage 103 may minimize a structure for forming a flow passage through a distributed arrangement. The connection flow passage 103 may be formed in a vertical direction.

Air passing through the connection flow passage 103 may flow into the humidification flow passage 106. The humidification flow passage 106 may be a section where moisture is supplied. In this embodiment, the humidification flow passage 106 may be a flow passage from the water tank humidification medium 51 to the discharge humidification medium 55.

While air passes through the water tank humidification medium 51, moisture may be supplied to the air in the connection flow passage 51. Then, water drops scattered from the watering unit 40 and moistures evaporated from the water tank 30 may be provided into the water tank 30.

As air passes through the discharge humidification medium 55, moisture may be supplied again to the air in the water tank 30.

Moisture may be supplied in the humidification flow passage 106 through the water tank humidification medium 51, the inside of the water tank 30, and the discharge humidification medium 55.

Air passing through the discharge humidification medium 55 may be exposed to the outside through the discharge flow passage 107.

Figure 6:
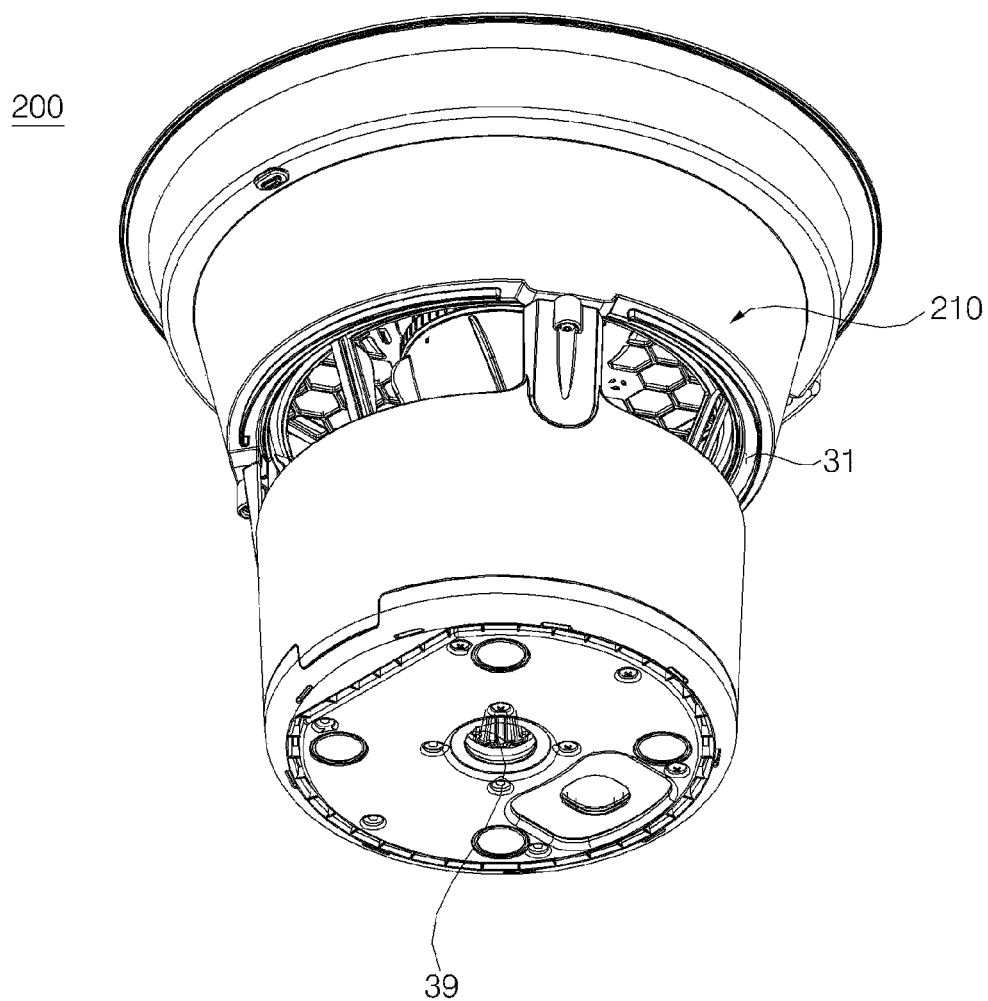
FIG. 6 is a perspective view illustrating an air wash module shown in FIG. 2 when viewed from bottom.
Figure 7:
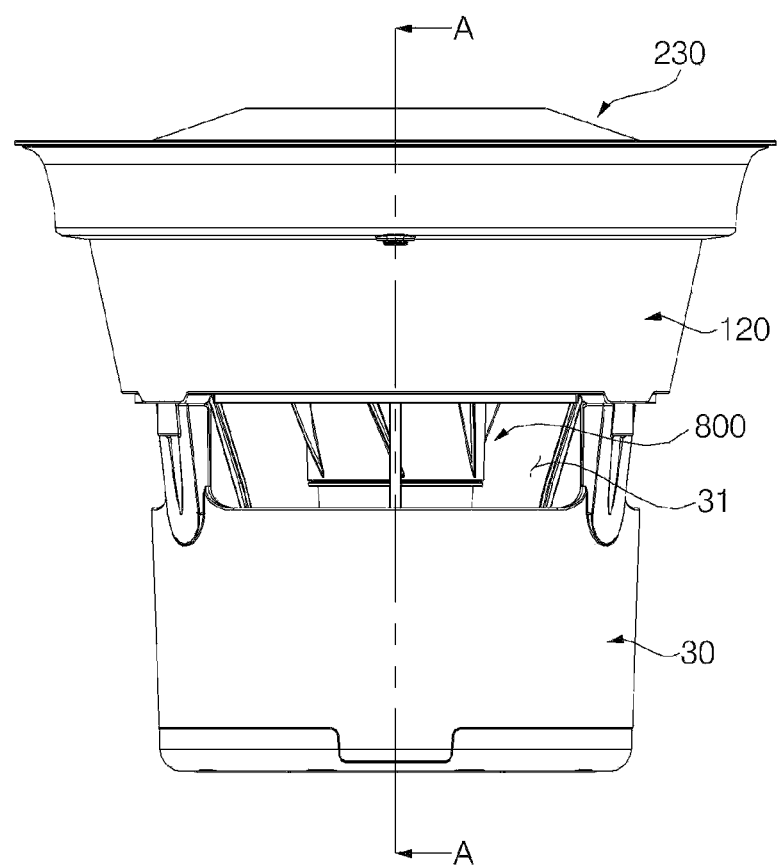
FIG. 7 is a front view illustrating an air wash module shown in FIG. 2.
Figure 8:
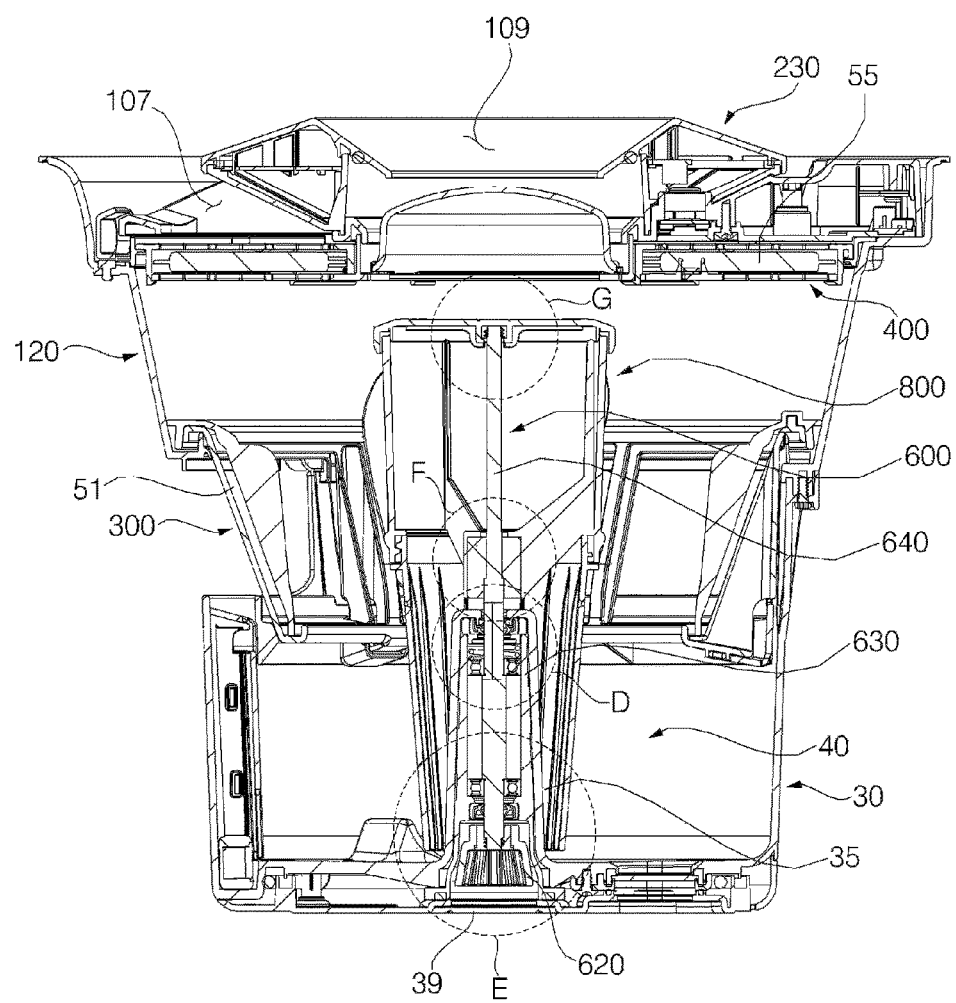
FIG. 8 is a cross-sectional view taken along line A-A of FIG. 7.
Figure 9:
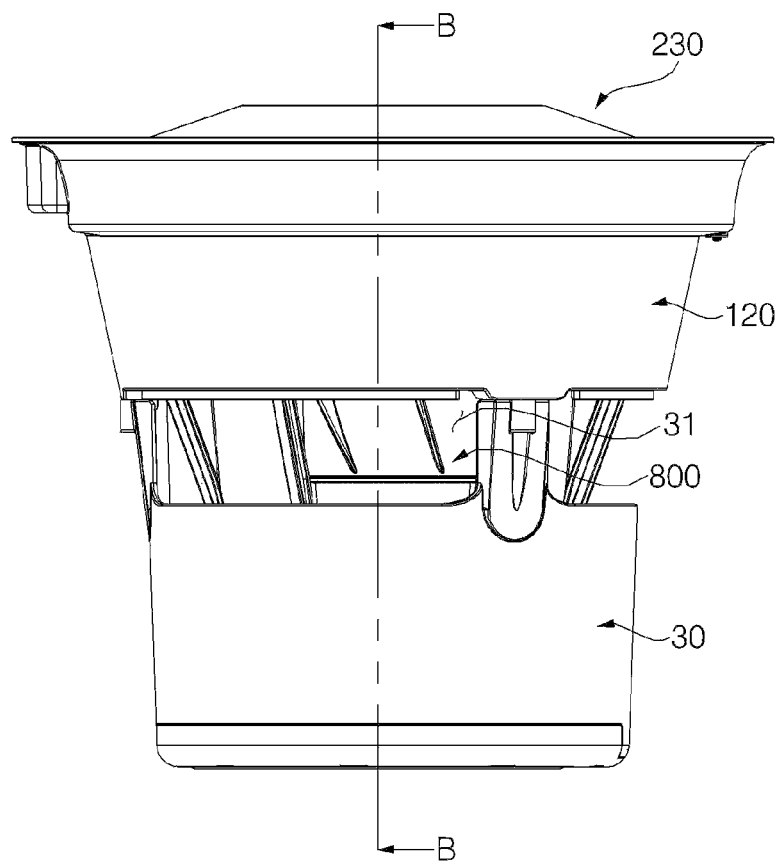
FIG. 9 is a left side view illustrating an air wash module shown in FIG. 2.
Figure 10:
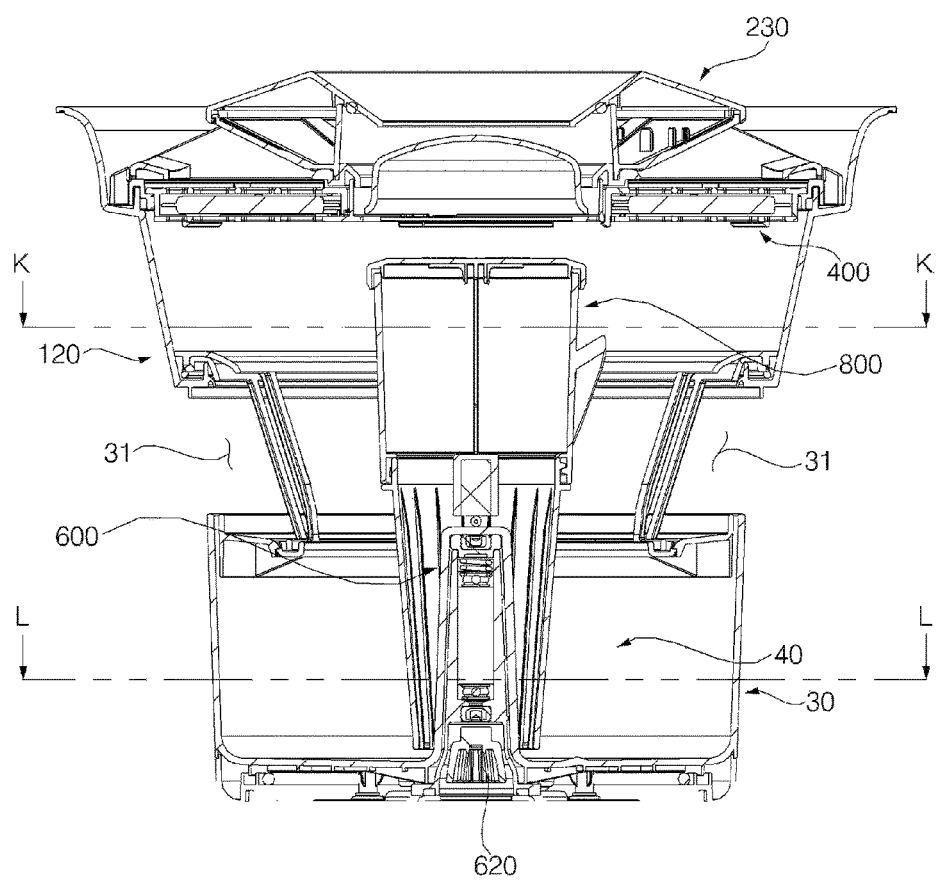
FIG. 10 is a cross-sectional view taken along line B-B of FIG. 9.
Figure 11:
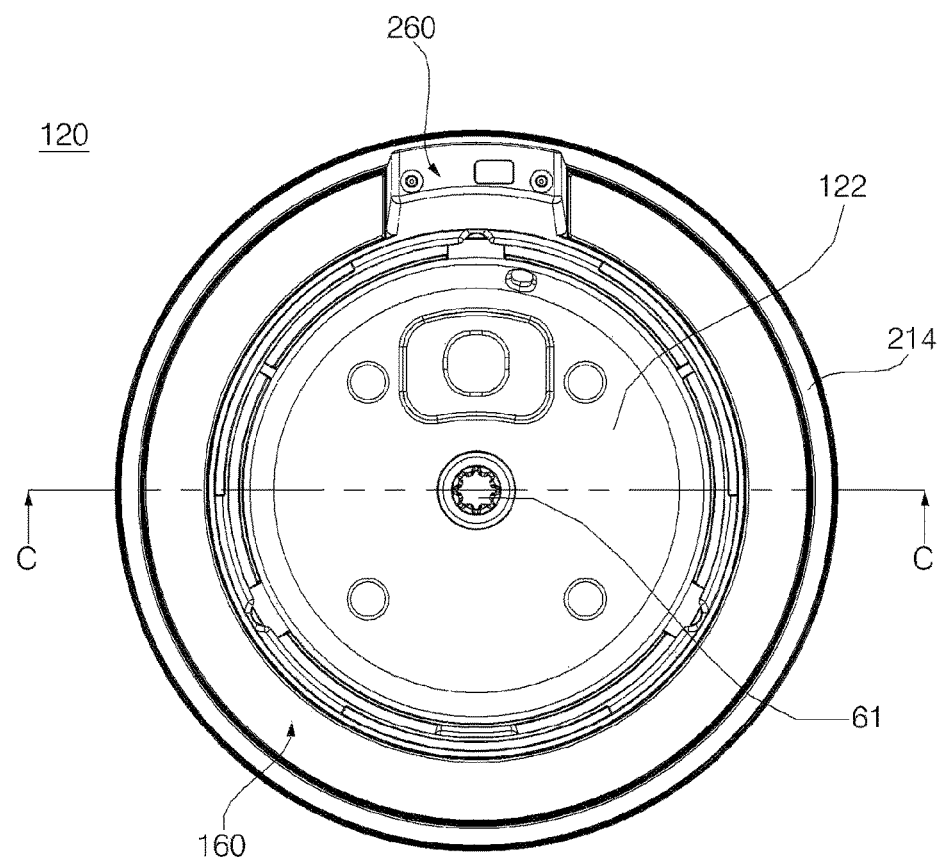
FIG. 11 is a plan view illustrating an upper body shown in FIG. 2.
Figure 12:
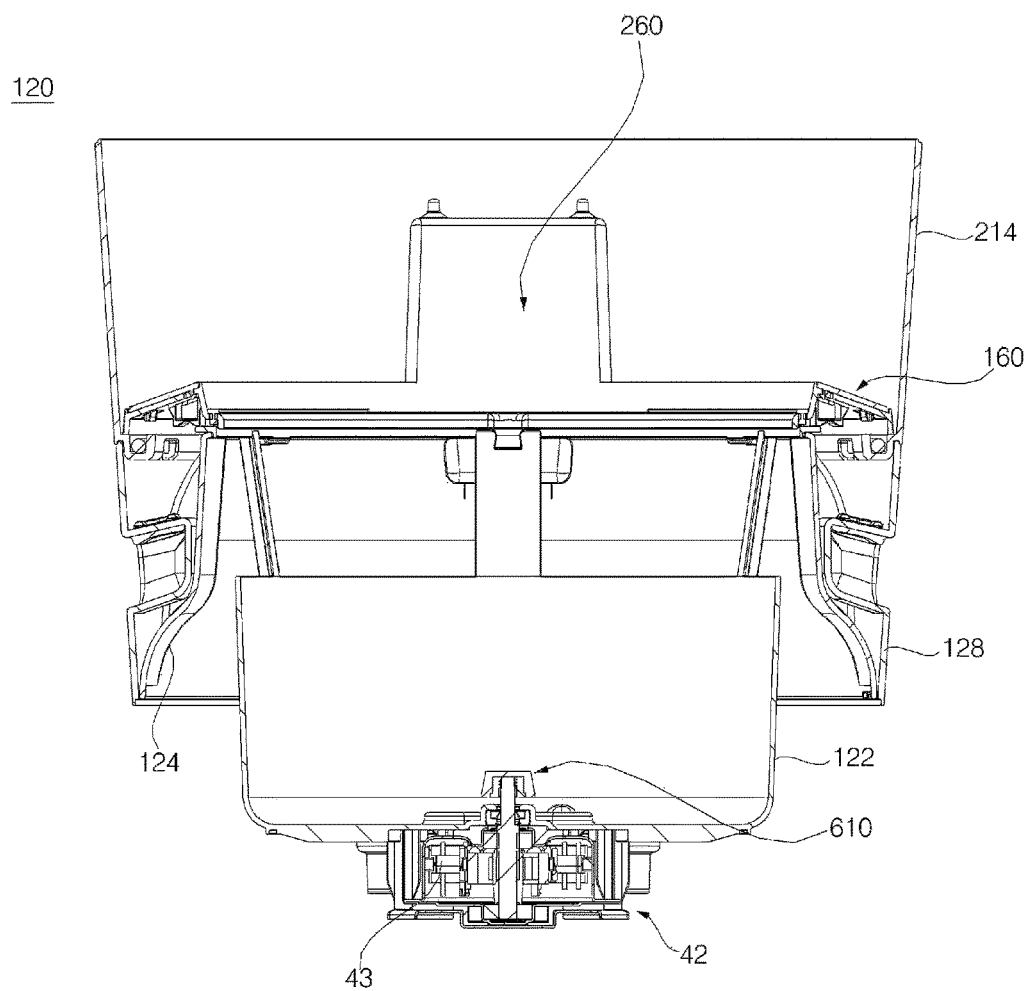
FIG. 12 is a cross-sectional view taken along line C-C of FIG. 11.
Figure 13:
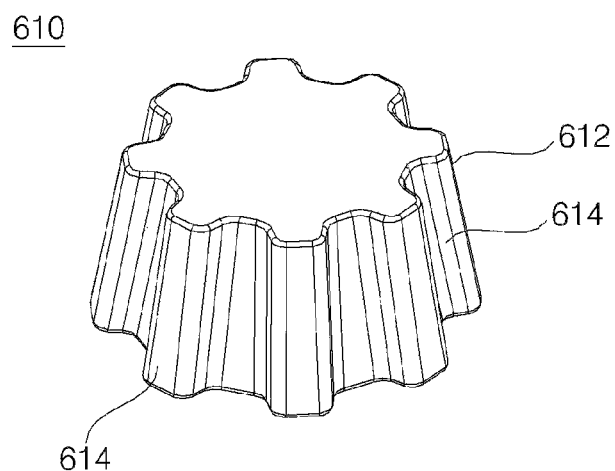
FIG. 13 is a perspective view illustrating a first coupler shown in FIG. 12.
Figure 14:
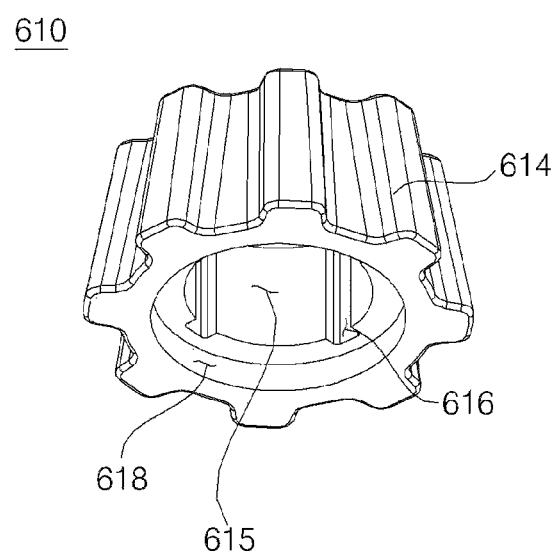
FIG. 14 is a perspective view of FIG. 13 viewed from bottom.
Figure 15:
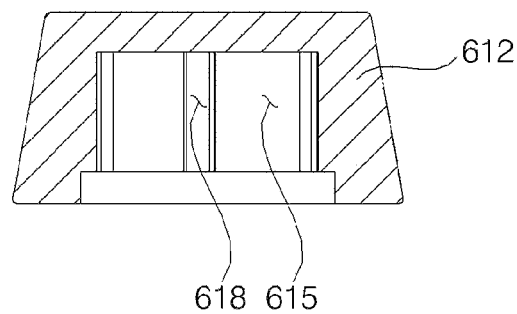
FIG. 15 is a side sectional view of FIG. 13.
Figure 16:
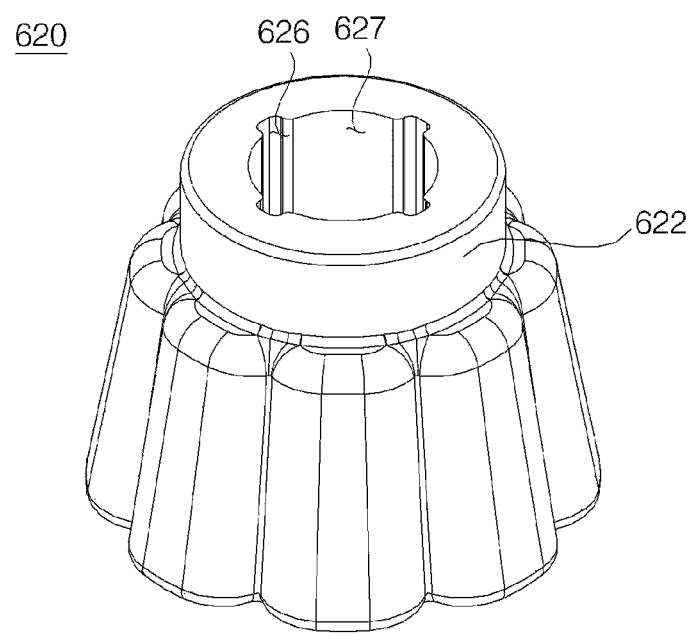
FIG. 16 is a perspective view of a second coupler shown in FIG. 8.
Figure 17:
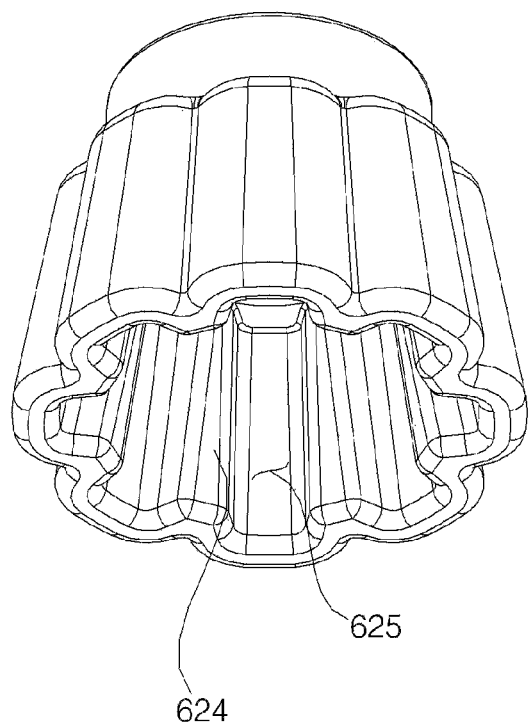
FIG. 17 is a perspective view of FIG. 16 viewed from bottom.
Figure 18:
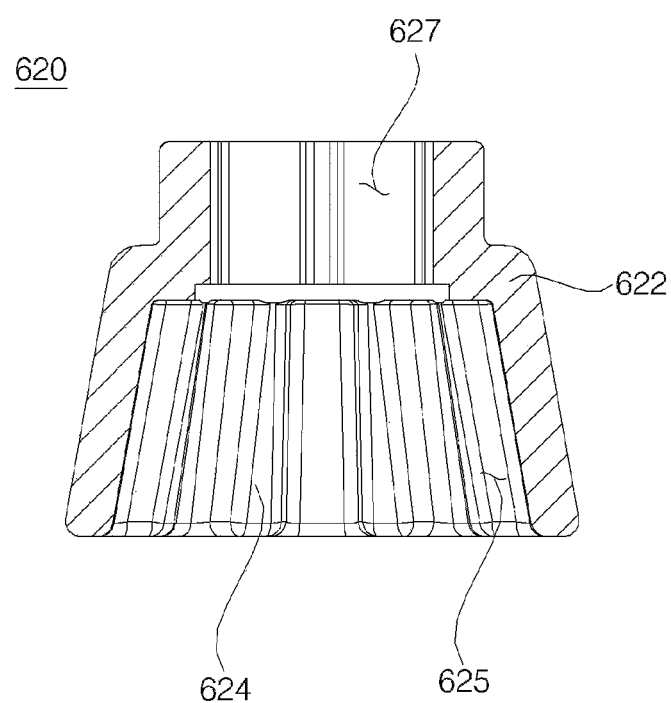
FIG. 18 is a side sectional view of FIG. 16.
Figure 19:
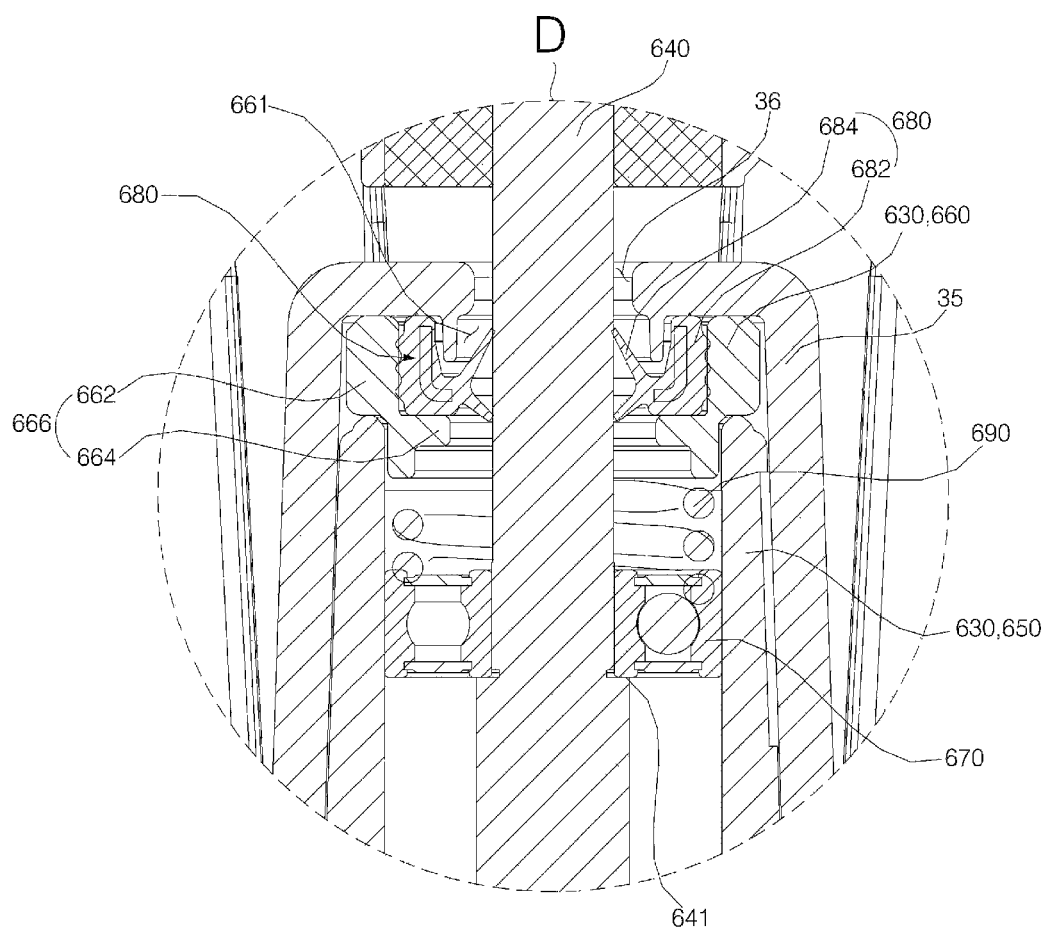
FIG. 19 is a magnified view of a portion D shown in FIG. 8.
Figure 20:
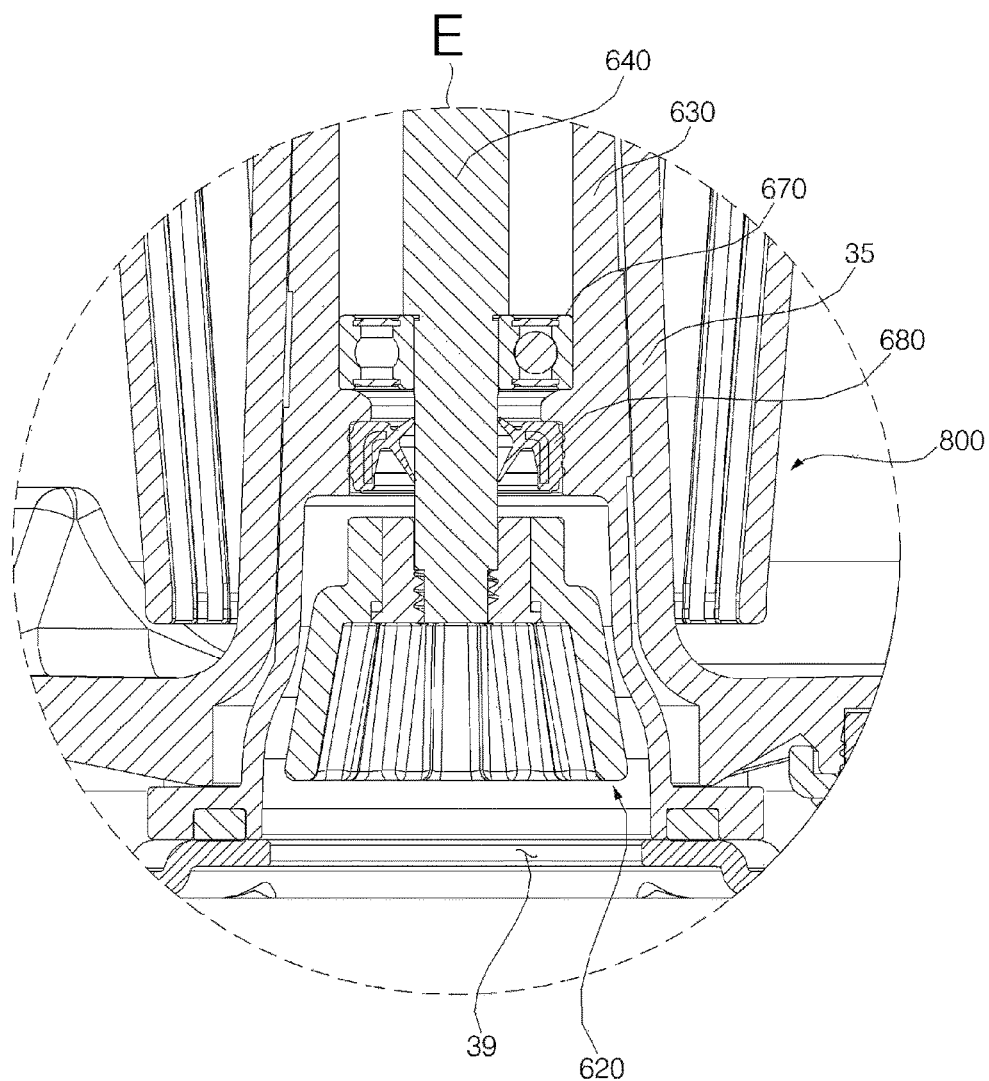
FIG. 20 is a magnified view of a portion E shown in FIG. 8.
Figure 21:
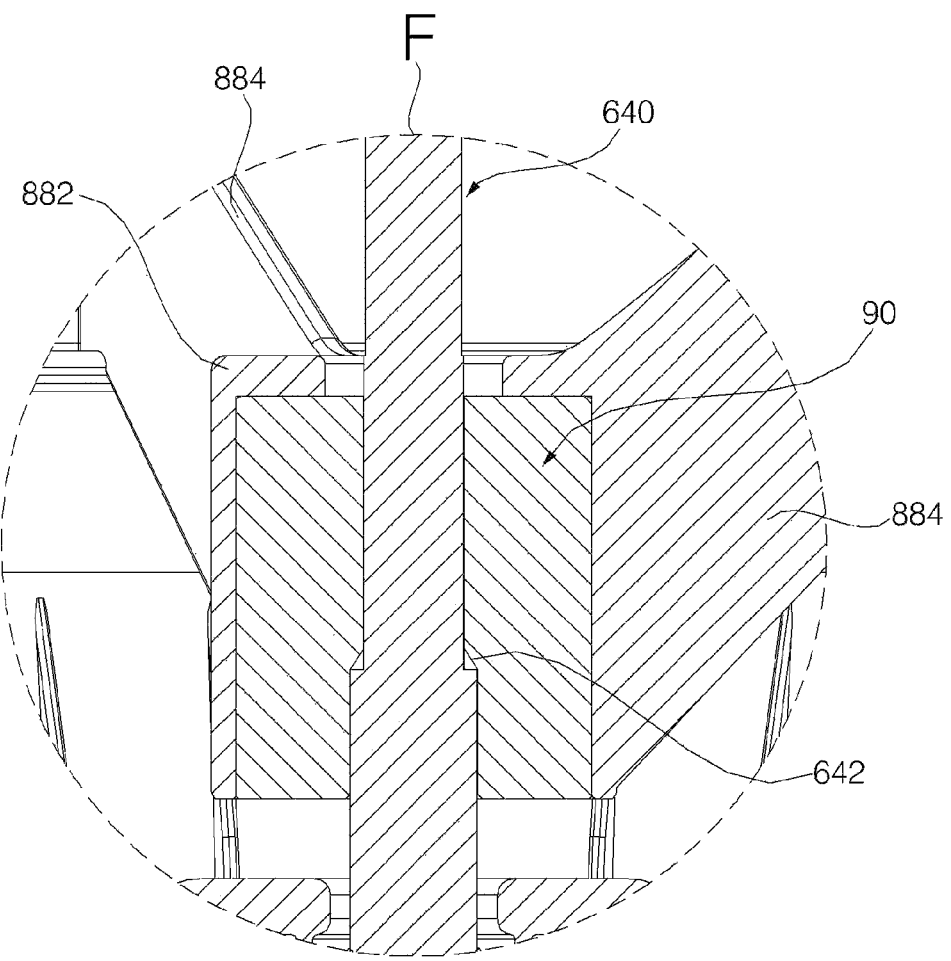
FIG. 21 is a magnified view of a portion F shown in FIG. 8.
Figure 22:
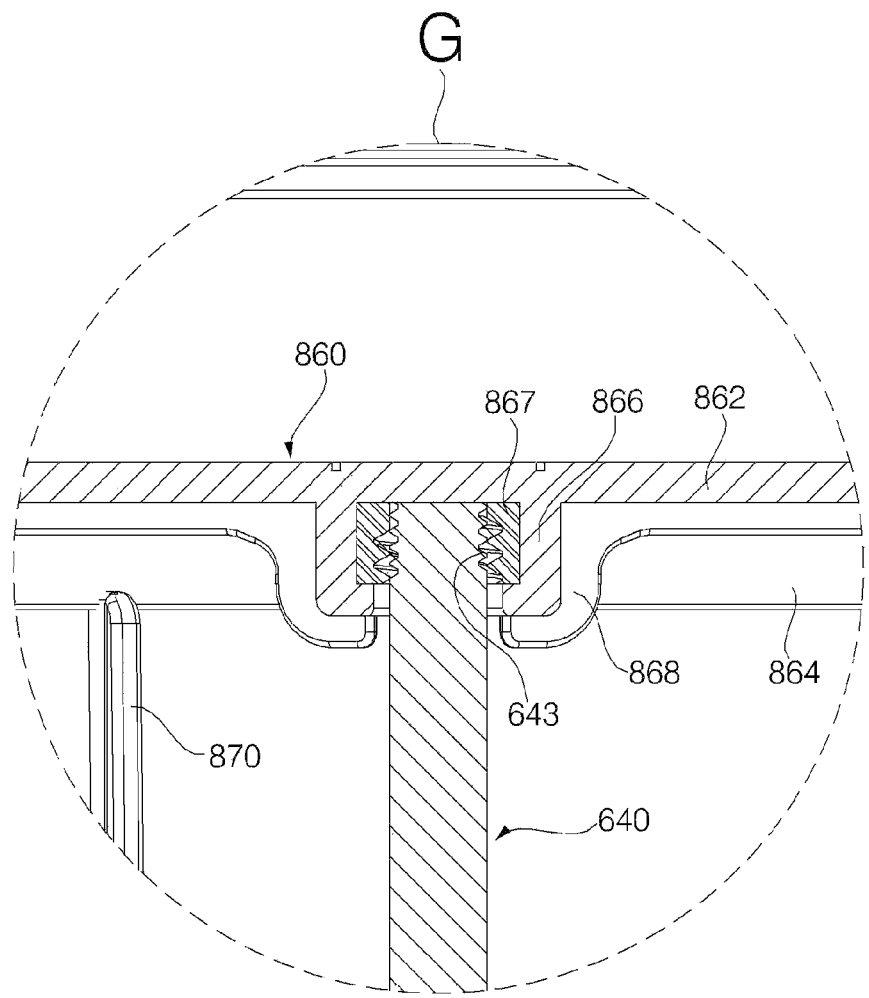
FIG. 22 is a magnified view of a portion G shown in FIG. 8.

FIG. 6 is a perspective view illustrating an air wash module shown in FIG. 2 when viewed from bottom. FIG. 7 is a front view illustrating an air wash module shown in FIG. 2. FIG. 8 is a cross-sectional view taken along line A-A of FIG. 7. FIG. 9 is a left side view illustrating an air wash module shown in FIG. 2. FIG. 10 is a cross-sectional view taken along line B-B of FIG. 9. FIG. 11 is a plan view illustrating an upper body shown in FIG. 2. FIG. 12 is a cross-sectional view taken along line C-C of FIG. 11. FIG. 13 is a perspective view illustrating a first coupler shown in FIG. 12. FIG. 14 is a perspective view of FIG. 13 viewed from bottom. FIG. 15 is a side sectional view of FIG. 13. FIG. 16 is a perspective view of a second coupler shown in FIG. 8. FIG. 17 is a perspective view of FIG. 16 viewed from bottom. FIG. 18 is a side sectional view of FIG. 16. FIG. 19 is a magnified view of a portion D shown in FIG. 8. FIG. 20 is a magnified view of a portion E shown in FIG. 8. FIG. 21 is a magnified view of a portion F shown in FIG. 8. FIG. 22 is a magnified view of a portion G shown in FIG. 8.

The watering unit 40 may rotate the watering housing 800 disposed inside the water tank 30 and spay water stored inside the water tank 30 to the inner side surface of the visual body 210 through the rotation of the watering housing 800.

The watering unit 40 may provide a structure for rotating the watering housing 800. The watering unit 40 may provide a power transmission module 600 for delivering power to the watering housing 800 in a separable structure of the water tank 30 and the upper body 120.

A structure of the watering unit 40 will be described in more detail as follows.

The watering unit 40 may include the watering housing 800, a watering motor 42, and the power transmission module 600.

The watering unit 40 may include a watering housing 800 disposed inside the water tank 30, drawing the water of the water tank 30 as rotating, pumping the drawn water upwardly, and discharging the pumped water to the outside, a watering motor 42 for providing a torque to the watering housing 800, and a power transmission module 600 for delivering a torque of the watering motor 42 to the watering housing 800.

After pumping the water stored in the water tank 30 upwardly, the watering housing 800 may have a configuration for spraying the pumped water to the outside in a radial direction.

The watering motor 42 may have a configuration for providing a torque for rotating the watering housing 800.

The power transmission module 600 may have a configuration for transmitting a torque of the watering motor 42 to the watering housing 800.

The watering housing 800, the watering motor 42, and the power transmission module 600 may be all installed at the water tank 30. In this case, a user may be required to lift the watering motor 42 when separating the air wash module 200. Additionally, in a case that even the watering motor 42 is assembled to the air wash module 200, if the air wash module 200 is required to be separated from the air clean module 200, the power supply structure of the watering motor 42 should be separable.

Therefore, this embodiment may suggest a structure where the heavy watering motor 42 is disposed at the upper body 120 and only the watering housing 800 and the power transmission module 600 are separated. A structure like this embodiment may minimize the weight of the separable air wash module 200.

In this embodiment, the watering housing 800 and the watering motor 42 may be separable. The watering housing 800 may be installed inside the air wash module 200, and the watering motor 42 may be installed inside the air clean module 100. When the air wash module 200 is separated, the watering housing 800 may be separated from the air clean module 100 together with the water tank 30.

In order for a separation structure of the watering housing 800 and the watering motor 42, in this embodiment, the power transmission module 500 may be designed to be separable.

Hereinafter, a power transmission module will be described in more detail.

The power transmission module 600 may be for delivering a torque of the watering motor 42 to the watering housing 800, and may include a power transmission structure that is separable. In this embodiment, couplers 610 and 620 may be disposed for separable power transmission.

A coupler disposed in the air clean module 100 and coupled to the watering motor 42 may be defined as the first coupler 610.

A coupler disposed in the air wash module 200 and separably coupled to the first coupler 610 may be defined as the second coupler 610.

One of the first coupler 610 and the second coupler 620 may have a male shape, and the other may have a female shape. In this embodiment the first coupler 610 may have a male shape, and the second coupler 620 may have a female shape. In this embodiment, the first coupler 610 may be separably coupled to and inserted into the second coupler 620. Unlike this embodiment, the second coupler 620 may be coupled to and inserted into the first coupler 610.

The watering motor 42 may be installed in the upper body 120. The watering motor 42 may be located over and spaced from the blower motor 22. The water tank 30 may be disposed in the upper body 120. When the water tank 30 is placed on the upper body 120, the first and second couplers 610 and 620 may be power-transmittably connected.

The watering motor shaft 43 of the watering motor 42 may be disposed so as to face upward. The first coupler 610 may be installed on the upper end of the watering motor shaft 43.

The upper body 120 may include an upper inner body 122 where the water tank 30 is mounted, an upper outer body 128 coupled to the upper inner body 122, disposed outside the upper inner body 122, and forming the appearance of the base body 110 as disposed outside the upper inner body 122 and coupled to the lower body 130, an upper guide 124 disposed between the upper inner body 122 and the upper outer body 128 and guiding air to the upper side of the upper inner body 122, and an outer visual body 214 coupled to the upper outer body 128 and formed of a transparent material to be disposed outside the visual body 128.

The first coupler 610 is disposed at the upper inner body 122. The first coupler 610 may be disposed inside the water tank insertion space of the upper inner body 122. The first coupler 610 may be disposed at the upper inner body 122 and exposed upwardly.

The first coupler 610 may be manufactured in a form that an upper section is narrow and a lower section is wide. The first coupler 610 may be in a form such as a cone and a pyramid.

The first coupler 610 may be formed with a section that becomes narrower as it goes upwardly. A teeth shape may be formed at the outer circumferential surface of the first coupler 610. The teeth shape of the first coupler 610 may be disposed radially on the basis of a watering motor axis 43.

The teeth shape of the first coupler 610 may form a serration with respect to a circumferential direction of the watering motor axis 43.

The first coupler 610 may include a first coupler body 612, a first serration 614, a motor shaft coupling part 615, a motor shaft groove 616, and an entrance preventing step 618. The first serration 614 may be formed on the outer surface of the first coupler body 612. The motor shaft coupling part 615 may be formed inside the first coupler body 612, may have a lower side thereof opened, and may receive the watering motor shaft 43. The motor shaft groove 616 may be formed in the motor shaft coupling part, and may provide a force for coupling with the watering motor shaft 43. The entrance preventing step 618 may restrict an insertion depth of the watering motor shaft 43.

The first coupler 610 may have an upper side surface thereof closed. Accordingly, the upper side surface of the first coupler body 612 may be flat. Unlike this embodiment, the upper side surface of the first coupler body 612 may be opened, and may communicate with the motor shaft coupling part 615.

The first serration 614 may protrude in a radial direction with respect to the watering motor shaft 43. The first serration 614 may longitudinally extend in a vertical direction. The first serration 614 may be disposed in plurality along the circumferential direction around the watering motor shaft 43. The first serration 614 may be obliquely formed in upward and downward directions. The first serration 614 may be obliquely formed so as to become closer to the central axis of the watering motor shaft 43 at an upper side thereof.

The upper side end of the watering motor shaft 43 may be inserted into the motor shaft coupling part 615. The watering groove 616 may be assembled with the watering motor shaft 43 by a press-fitting manner A protrusion (not shown) corresponding to the watering groove 616 may be formed on the watering motor shaft 43.

The entrance preventing step 618 may be supported by the watering motor shaft 43, and may restrict excessive movement when the first coupler 610 is assembled.

The first coupler 610 may be inserted into the second coupler 620, and may deliver a torque when the first coupler 610 and the second coupler 620 are coupled to each other.

The second coupler 620 may include a second coupler body 622, a coupler coupling part 625, a second serration 624, a power transmission shaft coupling part 627, and a power transmission shaft groove 626. The coupler coupling part 625 may be formed inside the second coupler body 622 and may have a lower side thereof opened to receive the first coupler 610. The second serration 624 may be formed on the inner side surface the second coupler body 622, and may engage with the first serration 614. The power transmission shaft coupling part 627 may be formed in the second coupler body 622, and may be coupled to the power transmission shaft 640 that delivers a torque to the watering housing 800. The power transmission shaft groove 626 may formed in the power transmission shaft coupling part 627, and may provide a force for coupling with the power transmission shaft 640.

The shape of the coupler coupling part 625 and the exterior of the first coupler body 612 may correspond to each other. The first coupler body 612 may be inserted into the coupler coupling part 625. The first coupler body 612 and the second coupler body 622 may be separated from each other in a vertical direction, and may be mutually interfered with each other in a rotation direction.

The power transmission shaft 640 may be disposed over the second coupler 620, and may be inserted into the power transmission shaft coupling part 627. The power transmission shaft 640 may be coupled to the power transmission shaft groove 626 by a press-fitting manner.

The power transmission shaft groove 626 may be radially disposed around the watering motor shaft 43, and may be concavely formed.

In this embodiment, the power transmission shaft coupling part 627 and the coupler coupling part 625 may communicate with each other. Unlike this embodiment, the power transmission shaft coupling part 627 and the coupler coupling part 625 may be separately formed.

The sectional area of the power transmission shaft coupling part 627 may be smaller than the sectional area of the coupler coupling part 625. Thus, there may be a step between the power transmission shaft coupling part 627 and the coupler coupling part 625, and the step may restrict the movement of the first coupler 610.

The second serration 624 may have a shape corresponding to the first serration 614, and may engage with the first serration 614.

The watering motor shaft 43 may be disposed under the first coupler 610, and the power transmission shaft 640 may be disposed over the second coupler 620. The watering motor shaft 43 and the power transmission shaft 640 may be aligned with each other in a line.

The first coupler 610 and the second coupler 620 may provide a clutch function. Only when the first coupler 610 and the second coupler 620 are coupled with each other, a torque of the watering motor shaft 43 may be delivered to the power transmission shaft 640.

Since the lower sectional area of the coupler coupling part 625 is larger and the upper sectional area thereof is smaller, the coupling of the first coupler 610 and the second coupler 620 can be easily performed when the air wash module 100 is placed.

Even though the first coupler 610 and the second coupler 620 are not accurately aligned with each other in a vertical direction, the first and second serrations 614 and 624 may enable the accurate alignment.

The power transmission module 600 is for delivering a torque of the watering motor 42 to the watering housing 800. In this embodiment, in relation to the power transmission module 600, most of the configuration may be installed at the water tank 30 and a partial configuration such as the first coupler 610 may be installed at the upper body 120.

The power transmission module 600 may include a power transmission housing 630 disposed inside the column 35 of the water tank 30, a power transmission shaft 640 disposed inside the power transmission housing 630, protruding upwardly as penetrating the power transmission housing 630, and providing a torque to the watering housing 800, a bearing 670 disposed between the power transmission shaft 640 and the power transmission housing 630, a second coupler 620 coupled to the lower end of the power transmission shaft 640 and delivering a torque to the power transmission shaft 640, and a first coupler 610 coupled to the watering motor axis 43, detachably coupled to the second coupler 620, and delivering a torque of the watering motor axis 43 to the second coupler 620 when coupled to the second coupler 620.

In this embodiment, in order to prevent the power transmission module 600 from contacting water, it may be installed inside the column 35.

In this embodiment, the power transmission housing 630, the power transmission shaft 640, the bearing 670, and the second coupler 620 may be disposed inside the column 35.

The power transmission shaft 640 may be installed to vertically penetrate the power transmission housing 630. The power transmission shaft 640 may rotate while penetrating the power transmission housing 630.

The power transmission housing 630 may be formed of a metallic material. The power transmission housing 630 may be formed of a high corrosion-resistant aluminum or brass.

The power transmission housing 630 may be installed inside the water tank 30. An insertion hole 39 for exposing the first coupler 610 may be formed at the water tank 30. The power transmission housing 630 may seal the upper side of the insertion hole 39.

The power transmission shaft 640 may penetrate the power transmission housing 630 vertically. The upper end of the power transmission shaft 640 may be coupled to the watering housing 800 and its lower end may be coupled to the second coupler 620.

In this embodiment, the second coupler 620 may be located at the undersurface upper side of the water tank 30, and may be disposed inside the power transmission housing 630. Unlike this embodiment, the second coupler 620 may be disposed under the undersurface of the water tank 30.

The bearing 670 may be disposed between the power transmission housing 630 and the power transmission shaft 640. In this embodiment, the power transmission shaft 640 may be disposed to penetrate the bearing 670.

The power transmission housing 630 may include a bearing housing 650 having an open upper side and lower side, a housing cap 660 coupled to the upper side of the bearing housing 650, where the power transmission shaft 640 penetrates vertically, a shaft gasket 680 disposed between the housing cap 660 and the power transmission shaft 640 and inserted into and fixed to the housing cap 660, and a housing elastic member 690 installed between the bearing 670 and the housing cap 660 to provide elasticity.

A bearing support end 641 for supporting the bearing 670 may be formed at the power transmission shaft 640. The bearing 670 may be supported by the bearing support end 641. The lower diameter of the bearing support end 641 may be formed greater than the upper diameter. The bearing 680 may be supported by the bearing support end 641 after inserted from the upper side of the power transmission shaft 640.

The housing cap 660 may be coupled to the upper end of the bearing housing 650. The housing cap 660 may be inserted into and fixed to the bearing housing 650. The housing cap 660 may be formed in a ring shape. A hollow 661 may be formed inside the housing cap 660 and the power transmission shaft 640 may penetrate the hollow 661 vertically.

The housing cap 660 may include a housing cap body 662 supported by the bearing housing 650 and having a hollow 661 that the power transmission shaft 640 penetrates and a cap support part 664 formed at the housing cap body 662 and supporting the shaft gasket 680.

The cap support part 664 may be formed protruding toward the power transmission shaft 640. The shaft gasket 680 may be supported by the cap support part 664.

The housing cap 660 may be disposed under the upper side of the column 35. A column opening part 39 that the power transmission shaft 640 penetrates may be formed at the column 35.

The housing cap 660 may support the shaft gasket 680 and allow the shaft gasket 680 to closely contact the inner upper side of the column 35.

The shaft gasket 680 may be formed of an elastic material.

The shaft gasket 680 may prevent the water of the water tank 30 from flowing into the column 35. A column hole 36 that the power transmission shaft 640 penetrates may be formed at an upper portion of the column 35. The housing cap 660 may be located disposed under the column hole 36, and the shaft gasket 680 may be disposed in the housing cap 660.

Additionally, the shaft gasket 680 may prevent water from flowing into the bearing housing 650.

The power transmission shaft 640 may be coupled to the watering housing 800 through the bearing 670, the shaft gasket 680, the housing cap 660, and the column 35.

The shaft gasket 680 may include a gasket body 682 closely contacting the cap support part 664 and a gasket diaphragm 684 protruding from the gasket body 682 toward the power transmission shaft 640.

The gasket body 682 may have an "L"-shaped section, and the outer side and the lower side thereof may be supported by the housing cap 660. The gasket diaphragm 684 may be formed integrally with the gasket body 682.

The gasket diaphragm 684 may closely contact the outer side surface of the power transmission shaft 640. The gasket diaphragm 684 may be formed in two in a vertical direction, and may doubly prevent inflow of water.

The housing elastic member 690 may be disposed between the housing cap 660 and the bearing 670. The upper end of the housing elastic member 690 may elastically support the housing cap 660 and the lower end thereof may elastically support the bearing 670.

The housing elastic member 690 may press the bearing 670 downwardly through elastic force. The bearing 670 may be supported by the bearing support end 641 through the housing elastic member 690.

The housing elastic member 690 may minimize the vibration of the bearing 670 when the power transmission shaft 640 rotates.

Although the power transmission housing 630 is installed inside the column 35 in this embodiment, unlike this embodiment, the power transmission housing 630 may be exposed to the inside of the water tank 30.

In this embodiment, the power transmission shaft 640 may longitudinally extend in a vertical direction. Since the power transmission shaft 640 is installed extending long in a vertical direction, the capacity of the water tank 30 may be easily increased to a desired capacity.

When the capacity of the water tank 30 is small, the second coupler 620 may also be directly installed in the watering housing 800. In this case, components such as the power transmission shaft 640 and the bearing 670 may be omitted, and thus the structure may become simpler.

When the capacity of the water tank 30 is large, the watering housing 800 having a long vertical length may be required. If the length of the watering housing 800 becomes long, vibration occurs during rotation. That is, when a torque is delivered to only the lower side of the watering housing 800, a deformation such as distortion of the watering housing 800 may be occur, and there may be a speed difference at the upper side and the lower side of the watering housing 800.

Due to such a deformation or a speed difference, a large amount of vibration may occur in the watering housing 800. Particularly, vibration may be further increased by water drawn and pumped into the watering housing 800. When the water drawn into the watering housing 800 is eccentrically disposed, greater vibration may occur.

In this embodiment, since the power transmission shaft 640 is coupled to each of the center of gravity and the upper end of the watering housing 800 while longitudinally extending in a vertical direction, the above-mentioned limitation can be overcome.

That is, in a structure as in this embodiment, even though the height of the watering housing 800 increases as the height of the water tank 30 increases, vibration can be minimized.

Hereinafter, a watering housing according to a first embodiment of the present invention will be described in more detail.

Figure 23:
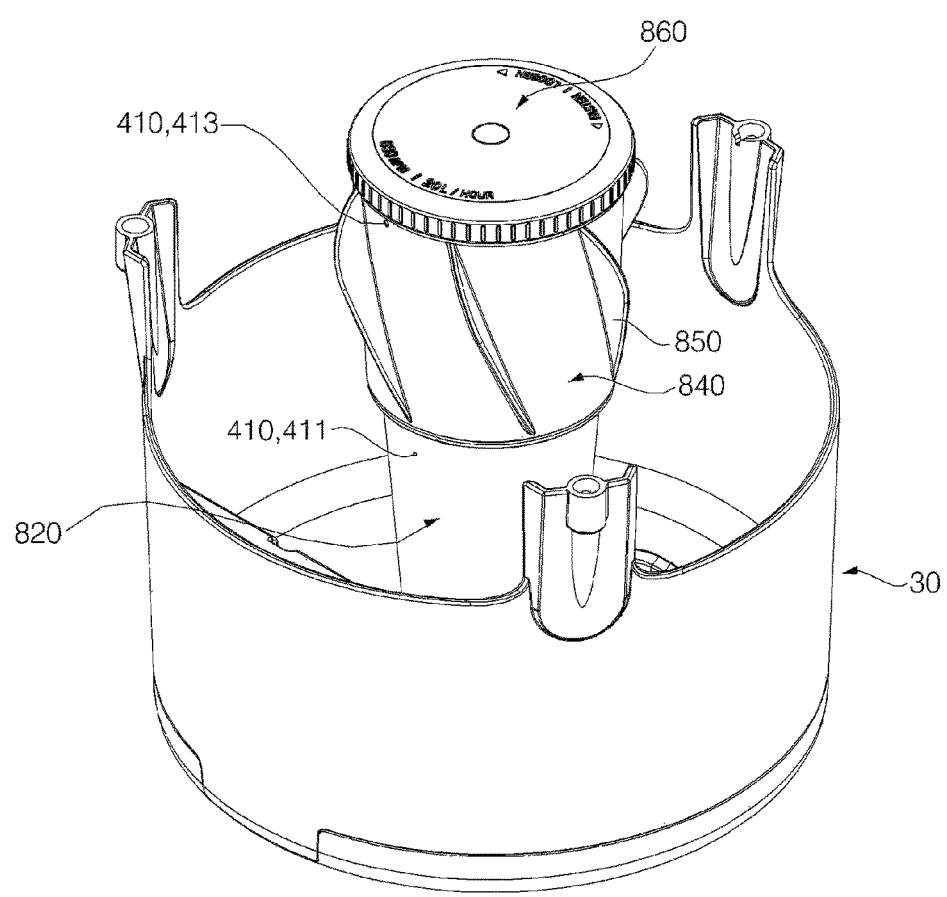
FIG. 23 is a perspective view illustrating an installation state of a watering housing shown in FIG. 4.
Figure 24:
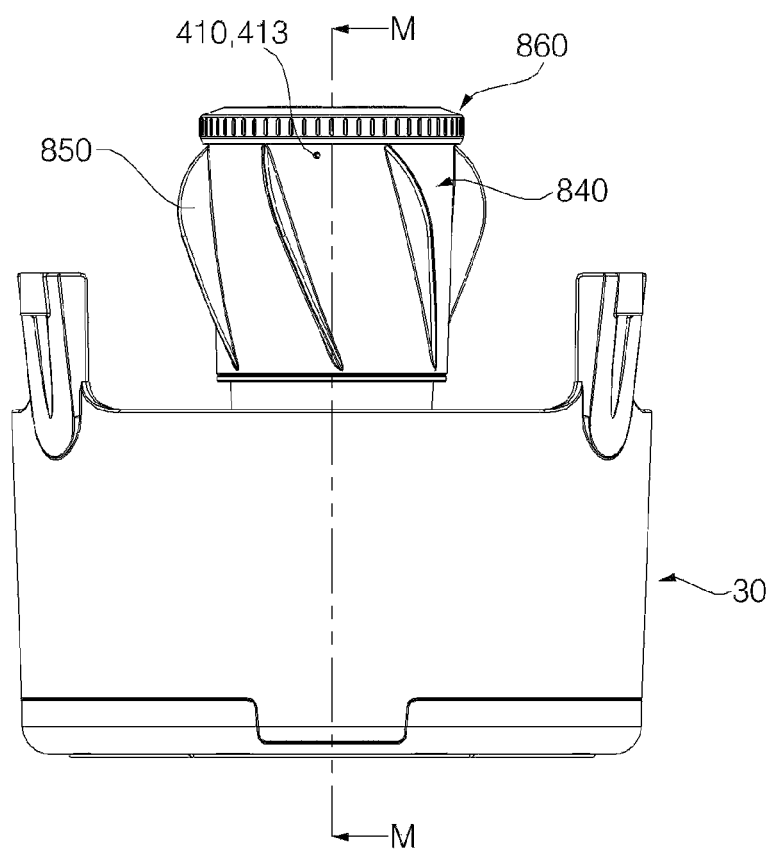
FIG. 24 is a front view of FIG. 23.
Figure 25:
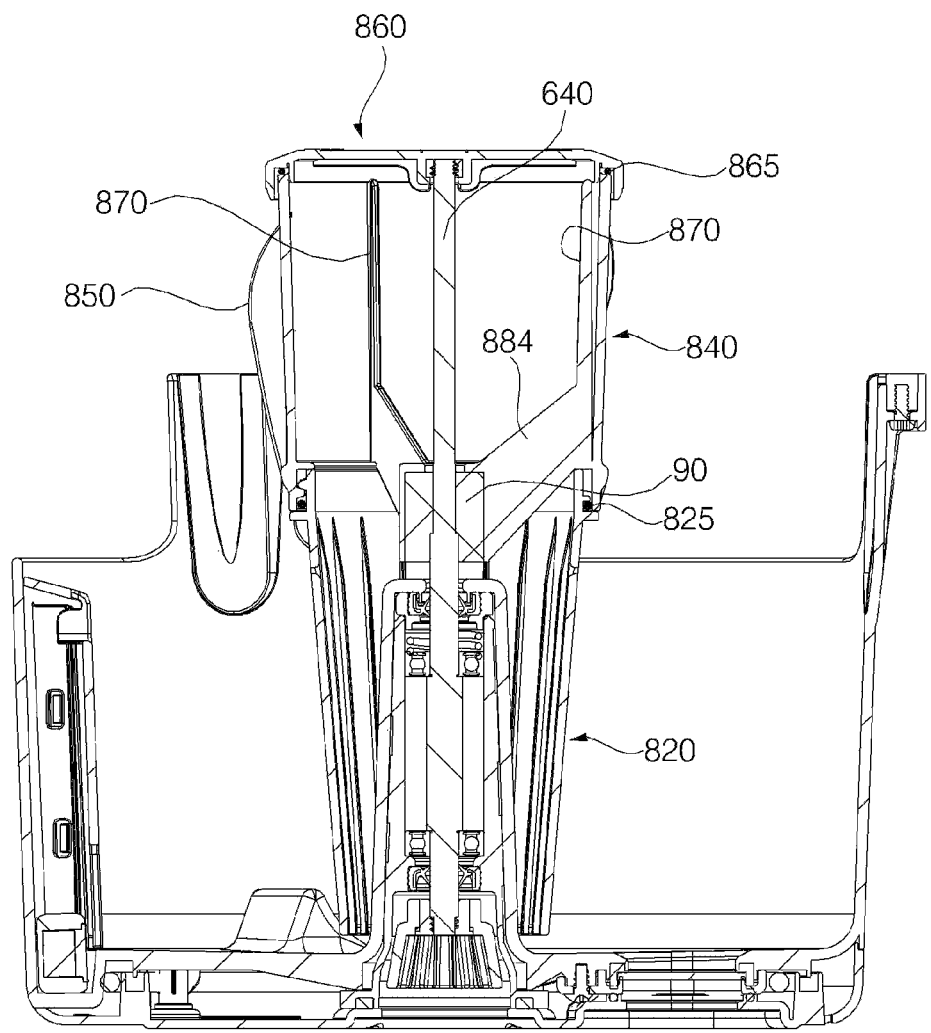
FIG. 25 is a cross-sectional view taken along line M-M of FIG. 24.
Figure 26:
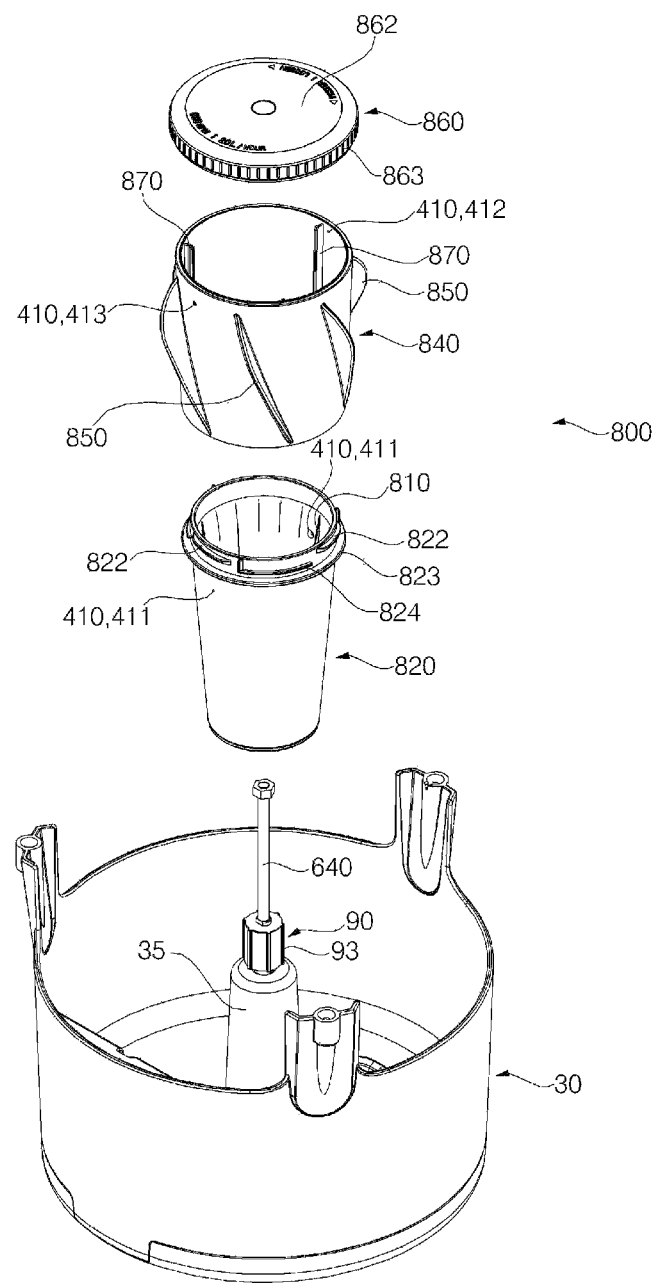
FIG. 26 is an exploded perspective view illustrating a watering housing shown in FIG. 23.
Figure 27:
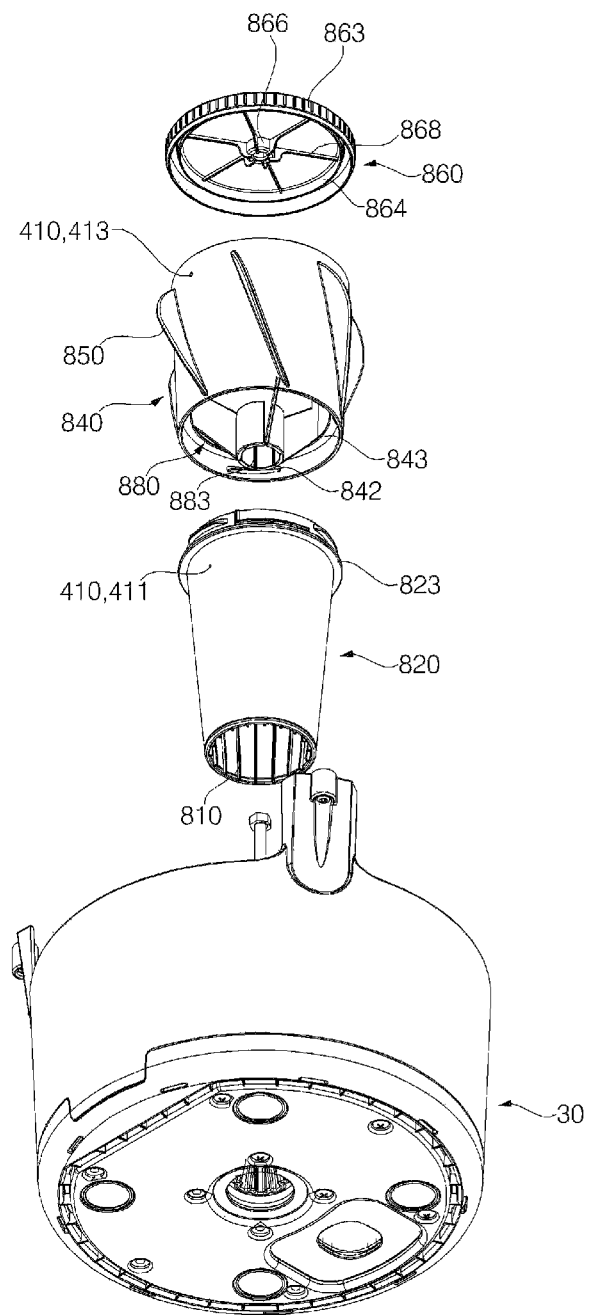
FIG. 27 is a perspective view of FIG. 26 viewed from bottom.
Figure 28:
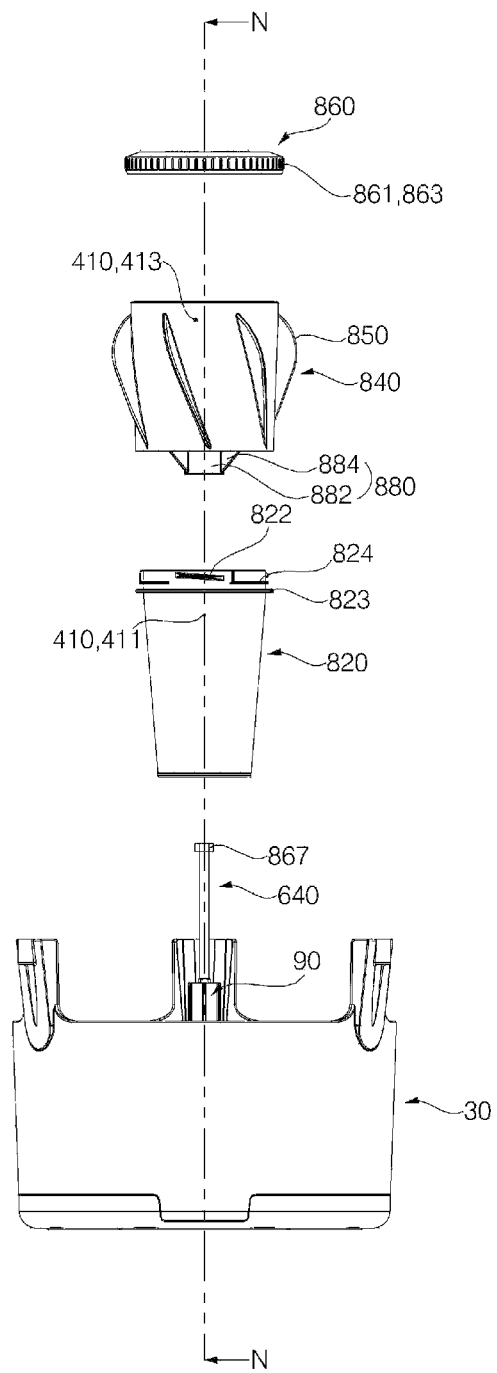
FIG. 28 is a front view of FIG. 26.
Figure 29:
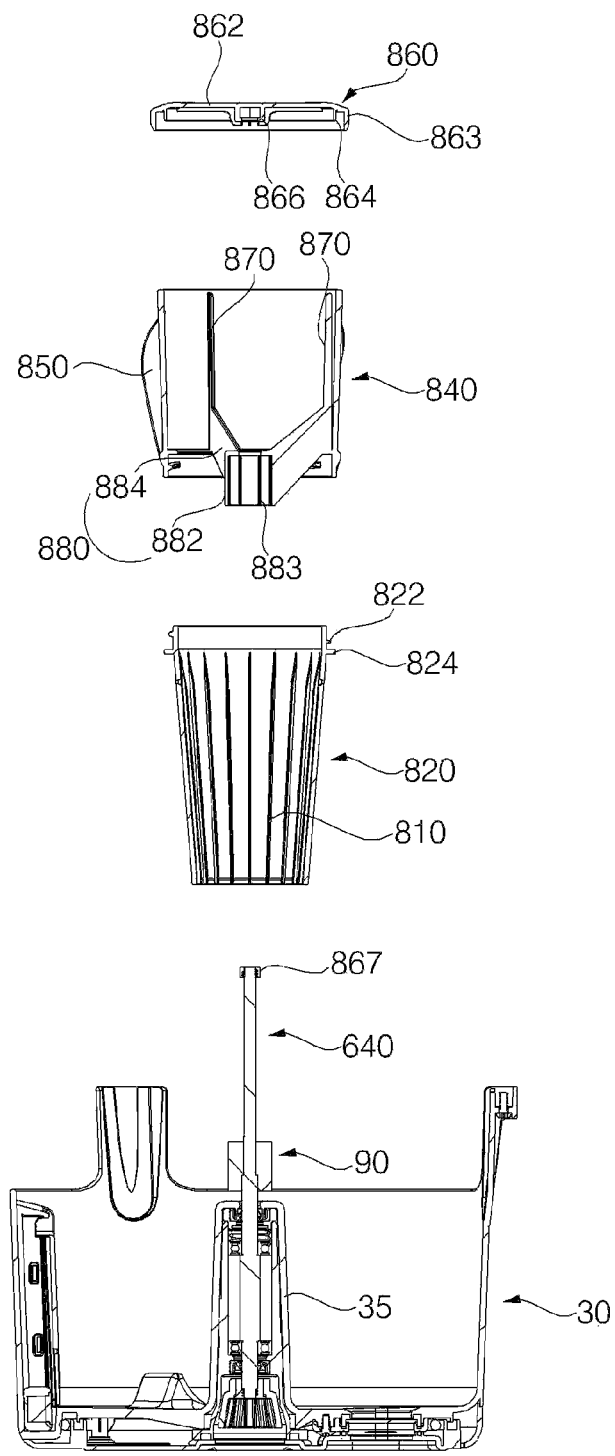
FIG. 29 is a cross-sectional view taken along line N-N of FIG. 28.
Figure 30:
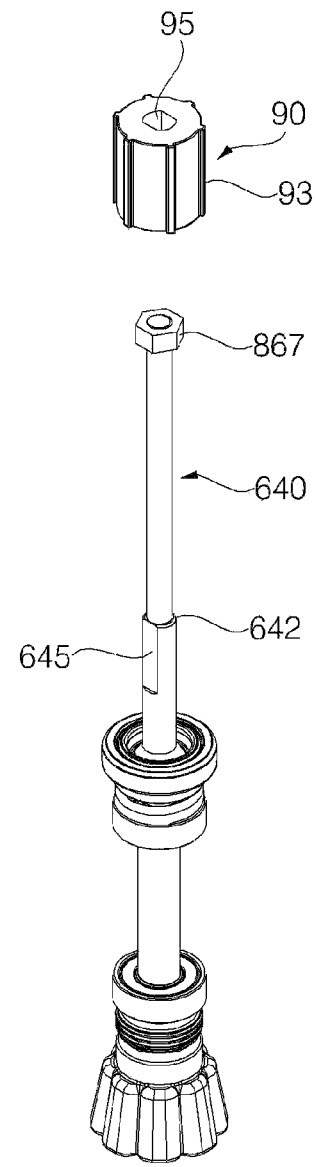
FIG. 30 is an exploded perspective view illustrating a power transmission shaft and a bushing shown in FIG. 26.
Figure 31:
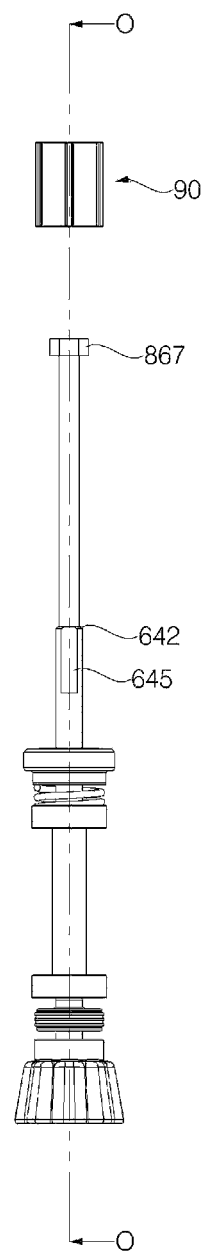
FIG. 31 is a front view of FIG. 30.
Figure 32:
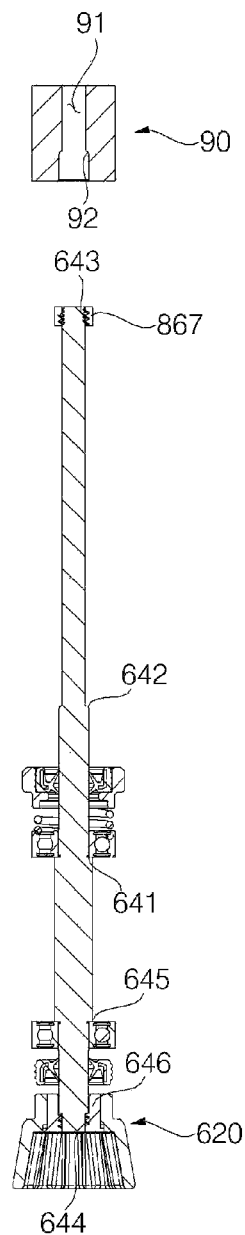
FIG. 32 is a cross-sectional view taken along line O-O of FIG. 31.

FIG. 23 is a perspective view illustrating an installation state of a watering housing shown in FIG. 4. FIG. 24 is a front view of FIG. 23. FIG. 25 is a cross-sectional view taken along line M-M of FIG. 24. FIG. 26 is an exploded perspective view illustrating a watering housing shown in FIG. 23. FIG. 27 is a perspective view of FIG. 26 viewed from bottom. FIG. 28 is a front view of FIG. 26. FIG. 29 is a cross-sectional view taken along line N-N of FIG. 28. FIG. 30 is an exploded perspective view illustrating a power transmission shaft and a bushing shown in FIG. 26. FIG. 31 is a front view of FIG. 30. FIG. 32 is a cross-sectional view taken along line O-O of FIG. 31.

The watering housing 800 may be a configuration for spraying water stored in the water tank 30. The watering housing 800 may be a component for spraying water stored in the water tank 30.

The watering housing 800 may rotate by a torque of a watering motor 42, and upon rotation, may draw water stored in the water tank 30 and then pump water upward. Water pumped into the watering housing 800 may be discharged through a nozzle 410.

A pumping unit may be disposed in the watering housing 800. The pumping unit may upwardly pump water in water tank 30. The pumping of water in the water tank 30 may be implemented in various methods.

For example, water may be pumped by the pump, and then may be sprayed.

For example, the watering housing 800 may rotate, and upon rotation, may pump water through friction or mutual interference with water.

In this embodiment, a structure in which water is pumped through rotation of the watering housing may be proposed. In this embodiment, the pumping unit may be a pump groove 810 which upwardly push water through friction or mutual interference with water.

The pump groove 810 that is a pumping unit may be disposed on the inner side surface of the watering housing 800. The pump groove 810 may improve the pumping efficiency. The pump groove 810 may protrude from the inner side surface of the watering housing 800. The pump groove 810 may longitudinally extend in a vertical direction. The pump groove 810 may be radially disposed with respect to the watering motor shaft 43 or the power transmission shaft 640.

The lower end of the watering housing 800 may be spaced from the undersurface of the water tank 30 by a certain gap to form a suction gap (H1) 801. Water of the water tank 30 may be drawn into the watering housing 800 through the suction gap 801.

The water level H2 of the water tank 30 enabling the watering housing 800 to spray water may be higher than the suction gap H1 and lower than the nozzle 410. The water level H2 may include the full water level.

When the water level H2 is lower than the suction gap H1, water may not be drawn, and thus pumping may be impossible. When the water level H2 is higher than the nozzle 410, water pumped in the nozzle 410 may not be sprayed.

The watering housing 800 may be downwardly opened. The watering housing 800 may have a cup shape. The watering housing 800 may have an inverted cup shape. A housing space 805 may be formed inside the watering housing 800.

The column 35 of the water tank 30 may be located inside the watering housing 800, and a power transmission module 600 may be disposed inside the column 35. The watering housing 800 may be disposed to cover the column 35.

The watering housing 800 may be formed such that the horizontal section thereof gradually expands in an upward direction. The column 35 may be formed such that the horizontal section thereof is gradually reduced in an upward direction. The shapes of the watering housing 800 and the column 35 may be implemented in order to efficiently pump water. The capacity of housing space 805 may gradually increase in an upward direction.

When the watering housing 800 rotates, drawn water may adhere closely to the inner circumferential surface of the watering housing 800 by a centrifugal force. The pump groove 810 formed on the inner circumferential surface of the watering housing 800 may provide a torque to water drawn to the inside.

A nozzle 410 may be disposed in the watering housing 800 to discharge drawn water to the outside. In this embodiment, the nozzle 410 may be disposed so as to discharge water in a horizontal direction. Pumped water may be discharged through the nozzle 410.

In this embodiment, water discharged out of the nozzle 410 may be sprayed to the visual body 210.

The number of nozzles 410 may vary with the design conditions. In this embodiment, the nozzle 410 may be disposed in plurality while having different heights from each other in the watering housing 800. A nozzle that is disposed at an upper side of the watering housing 800 may be defined as a second nozzle, and a nozzle that is disposed at a middle side of the watering housing 800 may be defined as a first nozzle.

Water sprayed from the first nozzle may be used for humidification. Water sprayed from the second nozzle may be used for humidification, watering and rain view.

Water sprayed from the second nozzle may flow down to wet the water tank humidification medium.

Water sprayed from the second nozzle may hit the visual body, and then may be scattered to form a rain view. Water sprayed from the second nozzle may hit the visual body, and then may be changed into fine droplets. These droplets may be used for watering for washing filtered air.

When the watering housing 800 rotates at the same speed as and faster than a first rotation speed, water may be sprayed from the first nozzle. When the watering housing 800 rotates at the same speed as and faster than a second rotation speed, water may be sprayed from the second nozzle.

The second rotation speed may be larger than the first rotation speed.

Only when the watering housing 800 rotates at a high speed, water may be discharged out of the second nozzle. The watering housing 800 may be disposed such that water is not discharged through the second nozzle at a usual rotation speed. The first nozzle may discharge water in all stages where watering housing ordinarily operates.

The second nozzle may be disposed in plurality. The first nozzle may be disposed in plurality.

When the watering housing 800 rotates at a usual rotation speed, pumped water may rise at least higher than the first nozzle. When the watering housing 800 rotates at a high speed, pumped water may rise to the same height as and higher than the second nozzle.

The second nozzle may be disposed in plurality in a circumferential direction of the watering housing 800. The first nozzle may also be disposed in plurality in a circumferential direction of the watering housing 800.

When the watering housing 800 does not rotate, water may not be discharged through the nozzle 410. When a user operates only clean mode (air clean module operates but air wash module stops), the watering unit 40 may not operate, and only the air blowing unit 20 may operate. When a user operates only humidification mode, the watering housing 800 may rotate, and water may be discharged out of the nozzle 410. When a user operates both air cleaning mode and humidification mode, water discharged out of the nozzle 410 may be sprayed to the inner side surface of the visual body 210.

Since the watering housing 800 rotates, water discharged from the nozzle 410 may hit the inner side surface of the visual body 210, and then may flow along the inner side surface of the visual body 210.

A user may visually check through the visual body 210 that water is sprayed. This spraying of water may mean that humidification mode is operating. Through the spraying of water, a user can intuitively check that humidification mode is operating.

Droplets may be formed on the visual body 210 by sprayed water, and the droplets may flow down.

In this embodiment, the watering housing 800 may have three parts. Unlike this embodiment, the watering housing 800 may be manufactured into one or two components.

The lower end of the watering housing 800 may be disposed to be spaced from the undersurface of the water tank 30 by a certain gap.

The watering housing 800 may include a first watering housing 820, a second watering housing 840, a watering housing cover 860, and a watering power transmission unit 880.

The watering housing 800 may be assembled with the power transmission shaft 640, and may include a structure disposed therein and receiving a torque from the power transmission shaft 640. In the watering housing 800, the watering power transmission unit 880 and the watering housing cover 860 may be assembled with the power transmission shaft 640. The watering housing 800 may be connected to the power transmission shaft 640 at two points, and may receive a torque from the two points.

Unlike this embodiment, the watering housing 800 may be connected to the power transmission shaft 640 at one point, and may receive a torque from the point.

Unlike this embodiment, the watering housing 800 may receive a torque by a method other than the power transmission shaft. For example, the torque of the watering motor may be delivered by a belt-pulley method. For example, the torque of the watering motor may be delivered by a gear engagement method. For example, the torque of the watering motor may be delivered by a chain method. For example, the torque of the watering motor may be delivered by a clutch method.

Hereinafter, the configuration of the power transmission shaft 640 will be described as follows.

In relation to the power transmission shaft 640, screw threads 643 and 644 may be formed at the upper end and the lower end, respectively, and bearing support ends 641 and 645 and an axis support end 642 may be formed at the outer peripheral surface.

The screw thread 643 may be assembled with the watering housing cover 860. The lower end screw thread 644 may be assembled with the second coupler 620.

The bearing support ends 641 and 645 and the axis support end 642 may be formed by varying the diameter of the power transmission shaft 640. The bearing support ends 641 and 645 may be for supporting a bearing. The axis support end 642 may be for supporting a watering power transmission part 880.

The lower end screw thread 644 may be directly fastened to the second coupler 620. In this embodiment, a separate coupler coupling member 646 may be disposed at a power transmission coupling part 627 of the second coupler 620 and the power transmission shaft 640 and the second coupler 620 are coupled through the coupler coupling member 646.

A power transmission shaft groove 626 may be vertically formed at the outer peripheral surface of the coupler coupling member 646, and a screw thread (not shown) assembled with the lower end screw thread 644 may be formed at the inner peripheral surface.

Hereinafter, the configuration of the watering housing 800 will be described as follows.

The first watering housing 820 may have the upper and lower sides opened, and may have the pump groove 810 disposed therein. The lower end of the first watering housing 820 may be spaced from the undersurface of the water tank 30 by a certain gap to form a suction gap 801.

The second watering housing 840 may have the upper and lower sides opened, and may be assembled with the upper end of the first watering housing 820.

The watering housing cover 860 may be coupled to the upper end of the second watering housing 840, and may cover the upper surface of the second watering housing 840.

The watering power transmission unit 880 may be connected to at least one of the first watering housing 820 and the second watering housing 840 to receive a torque of the power transmission module 600. In this embodiment, the watering power transmission unit 880 may be connected to the first watering housing 820.

Unlike this embodiment, the first watering housing 820 and the second watering housing 840 may be integrally manufactured. Also, unlike this embodiment, the first watering housing 820 and watering housing cover 860 may be integrally manufactured.

The upper section of the first watering housing 820 may be larger than the lower section thereof. The first watering housing 820 may form an oblique in upward and downward directions. The first watering housing 820 may have a conical shape, a lower section of which is narrow.

The pump groove 810 may be disposed inside the first watering housing 820. The pump groove 810 may be formed in a vertical direction. The pump groove 810 may be radially disposed around the watering motor shaft 43. The pump groove 810 may be disposed in plurality, and may protrude to the axial center of the watering housing 800.

The lower end of the first watering housing 820 may be spaced from the undersurface of the water tank 30 to form the suction gap 801. The upper end of the first watering housing 820 may be coupled to the lower end of the second watering housing 840.

The first watering housing 820 and the second watering housing 840 may be assembled and disassembled. In this embodiment, the first watering housing 820 and the second watering housing 840 may be assembled through screw coupling. The first watering housing 820 may have a screw thread 822 formed on the outer circumferential surface of the upper side thereof, and the second watering housing 840 may have a screw thread 842 formed on the inner circumferential surface of the lower side thereof.

The screw thread 822 formed on the first watering housing 820 may be defined as a first thread 822, and the screw thread 842 formed on the second watering housing 840 may be defined as a second thread 842.

A first barrier 823 may be formed under the first thread 822 to restrict the movement of the second watering housing 840. The first barrier 823 may be formed in a circumferential direction of the first watering housing 820. The first barrier 823 may be formed into a strip shape, and may outwardly protrude from the first watering housing 820.

When the first watering housing 820 and the second watering housing 840 are assembled, the first barrier 823 may adhere closely to the lower end of the second watering housing 840. The first barrier 823 may outwardly protrude more than the first thread 822.

A first packing 825 may be disposed between the first thread 822 and the first barrier 823. The first packing 825 may inhibit a leakage from the watering housing 800. The first packing 825 may be formed of an elastic material. The first packing 825 may have a ring shape.

A packing installation rib 824 may be disposed to fix the location of the first packing 825. The packing installation rib may be disposed on the extension line of the first thread 822. The packing installation rib 824 may be a portion of the first thread 822.

Accordingly, the first thread 822 may be formed in plurality, and may be discontinuously distributed.

A normal nozzle 411 may be disposed in the first watering housing 820. In this embodiment, two normal nozzles 411 may be disposed. The two normal nozzles 411 may be disposed so as to direct the opposite direction to each other.

The normal nozzle 411 may communicate the inner and outer sides of the first watering housing 820. In this embodiment, the aperture area of the inside of the normal nozzle 411 may be larger than the aperture area of the outside of the first nozzle 411.

A watering blade 850 may be formed on the outer circumferential surface of the second watering housing 840. The watering blade 850 may allow humidified air to flow. Also, the watering blade 850 may be formed in a direction of downwardly pressurizing the watering housing 800. When the watering housing 800 rotates, the watering housing 800 may be upwardly pressurized by pumped water. It may be desirable that the watering blade 850 is formed in a direction of downwardly pressurizing the watering housing 800.

When the watering housing 800 rotates, the watering blade 850 may attract ambient air and may allow ambient air to flow downward. Air of the humidification flow passage 106 disposed in the watering housing 800 may mostly flow to the discharge flow passage 107 by the operation of the blower fan 24, but air around the watering blade 850 may flow in the opposite direction.

The watering blade 850 may locally form an air flow in the opposite direction of an air flow by the blower fan 24. The air flow by the watering blade 850 may have an effect of flowing water particles around the watering housing 800 into the water tank 30. The rotation of the watering blade 850 may generate a downward wind, and may attract water particles of the humidification space 106.

Also, the air flow by the watering blade 850 may serve to gather dropping water into the watering housing 800 when water drops from the water supply flow passage 109 to the upper part of the watering housing 800.

When the watering housing 800 rotates and water is supplied through the water supply flow passage 109, water may hit the surface of the watering housing 800 to be irregularly scattered. The air flow by the watering blade 850 may gather water particles scattering during water supply toward the surface of the watering housing 800.

The second watering housing 840 may include high-speed nozzles 412 and 413 formed therein. The high-speed nozzles 412 and 413 may spray water toward the visual body 210. In this embodiment, two high-speed nozzles 412 and 413 may be disposed. The high-speed nozzles may be defined as a first high-speed nozzle 412 and a second high-speed nozzle 413.

The first high-speed nozzle 412 and the second high-speed nozzle 413 may be formed to face the opposite directions based on the power transmission shaft 640.

In this embodiment, the first high-speed nozzle 412 and the second high-speed nozzle 413 may have a certain height difference. The first high-speed nozzle 412 and the second high-speed nozzle 413 may not be disposed at the same height.

Due to the height difference between the first high-speed nozzle 412 and the second high-speed nozzle 413, the location of water sprayed to the visual body 210 may be differently set. When the watering housing 800 rotates, water sprayed from the first high-speed nozzle 412 and water sprayed from the second high-speed nozzle 413 may pass different paths.

The path of water colliding with the inner side surface of the visual body 210 may be defined as a spray line.

The spray line formed by the first high-speed nozzle 412 may be defined as a first spray line, and the spray line formed by the second high-speed nozzle 413 may be defined as a second spray line.

In this embodiment, water sprayed from the first high-speed nozzle 412 may pass any one location of the visual body 210, and after a certain time, water sprayed from the second high-speed nozzle 413 may pass another location having a different height. That is, two spray lines may be formed on the inner side surface of the visual body 210, and a user can more effectively recognize that water is sprayed through this visual show.

When water is discharged from the two high-speed nozzles disposed at a certain height, only one spray line may be formed. When the watering housing 800 rotates at a high speed, a phase difference may be very short even though the first and second high-speed nozzle 142 and 143 are located at the opposite directions. In this case, an optical illusion that water flows down from one spray line may be caused.

Meanwhile, when two spray lines are formed, locations which water hits may differ. Accordingly, sounds generated by water hitting may be different. That is, a sound generated from the first spray line and a sound generated from the second spray line may be different. Due to this sound difference, a user can acoustically check that the watering housing 800 is rotating.

The sound differences through the spray lines may have an effect of efficiently delivering the operation situation to visual or hearing impaired persons. Also, even in a dark environment, it may be easy to check that the humidification and air cleaning apparatus is operating.

Meanwhile, a water curtain inhibiting rib 870 may be disposed inside the second watering housing 840 to inhibit a water curtain rotation flow. The water curtain rotation flow may mean a flow rotating along the inner side surface of the watering housing 800.

The pump groove 810 of the first watering housing 820 may be for forming the water curtain rotation flow, and the water curtain inhibiting rib 870 may be for inhibiting the water curtain rotation flow.

In the first watering housing 820, since water needs to be pumped up to the second watering housing 840, the water curtain rotation flow may be actively generated. However, in regard to water raised up to the second watering housing 840, when the water curtain rotation flow is not formed, water may be easily sprayed through the high-speed nozzles 412 and 413.

When a high-speed water curtain rotation flow is formed inside the second watering housing 840, water may not be discharged through the high-speed nozzles 412 and 413, and may flow along the inside.

Also, when a larger amount of water stays in the second watering housing 840, the vibration of the watering housing may increases. Only when water pumped to the second watering housing 840 is quickly sprayed through the high-speed nozzles 412 and 413, the eccentricity of the watering housing 800 can be minimized, and thus the vibration according thereto can be minimized.

The water curtain inhibiting rib 870 may minimize the water curtain rotation flow, and thus may serve to minimize the eccentricity and vibration of the watering housing 800.

The water curtain inhibiting rib 870 may protrude toward the power transmission shaft 640 from the inner side surface of the second watering housing 840. The water curtain inhibiting rib 870 may be formed in a direction of crossing the water curtain rotation flow.

The water curtain rotation flow may form a spiral form or circular form along the inner side surface of the second watering housing 840, and thus the water curtain inhibiting rib 870 may be formed in upward and downward directions.

In this embodiment, the water curtain inhibiting rib 870 may be formed in a vertical direction. The water curtain inhibiting rib 870 may be disposed in plurality. In this embodiment, three water curtain inhibiting ribs 870 may be disposed. The plurality of the water curtain inhibiting ribs 870 may be disposed at a uniform interval around the power transmission shaft 640.

In this embodiment, the water curtain inhibiting rib 870 may protrude by about 5 mm. The protrusion length of the water curtain inhibiting rib 870 may relate to the thickness of the water curtain rotation flow, and may be variously changed in accordance with embodiments.

The water curtain inhibiting rib 870 may be connected to the watering power transmission unit 880 described later. A mold can be simplified by manufacturing the water curtain inhibiting rib 870 so to be connected to the watering power transmission unit 880.

The watering power transmission unit 880 may be a component for delivering a torque of the power transmission shaft 640 to the watering housing 800.

In this embodiment, the watering power transmission unit 880 may be connected to the second watering housing 840. Unlike this embodiment, the watering power transmission unit 880 may also be connected to the first watering housing 820.

In this embodiment, the watering power transmission unit 880 may be manufactured integrally with the second watering housing 840. Unlike this embodiment, the watering power transmission unit 880 may be assembled with the second watering housing 840.

The watering power transmission unit 880 may include a bushing installation part 882 located at the axial center of the watering housing 800, and a watering connection part 884 connecting the bushing installation part 882 and the watering housing 800. In this embodiment, the bushing installation part 882, the watering connection part 884, and the second watering housing 820 may be integrally injection-molded.

The watering connection part 884 may be manufactured into a rib shape. The watering connection part 884 may be radially disposed based on the axial center, and may be disposed in plurality.

In this embodiment, the watering connection part 884 may be manufactured integrally with the water curtain inhibiting rib 870. The watering connection part 884 and the water curtain inhibiting rib may be connected to each other.

The power transmission shaft 640 may be installed so as to penetrate the bushing installation part 882.

The lower side of the bushing installation part 882 may be opened. A bushing 90 may be inserted through the lower side of the bushing installation part 882.

The bushing installation part 882 and the bushing 90 may be separable in a vertical direction. The bushing installation part 882 and the bushing 90 may be subject to mutual stopping in a rotation direction.

For this, a bushing stopping part 93 may be formed on any one of the bushing installation part 882 and the bushing 90, and a bushing stopping groove 883 may be formed on the other. In this embodiment, the bushing stopping part 93 may be formed on the bushing 90, and the bushing stopping groove 883 may be formed in the bushing installation part 882.

The bushing stopping groove 883 may be formed in the inner side surface of the bushing installation part 882, and may have a concave shape. The bushing stopping part 93 may be formed on the outer surface of the bushing 90, and may have a convex shape.

The bushing stopping part 93 may be inserted and fitted into the bushing stopping groove 882.

The bushing 90 may be coupled to the power transmission shaft 640 of the power transmission module 600.

The bushing 90 may be coupled to the power transmission shaft 640 to receive a torque. The bushing 90 may be formed of a metallic material. When the bushing 90 is not formed of a hard metallic material, abrasion may occur, thereby causing vibration.

The bushing 90 may have a bushing axis hollow 91 formed therein and penetrating the bushing 90 in a vertical direction. The power transmission shaft 640 may be inserted into the bushing axis hollow 91.

When the watering housing 800 rotates, the bushing 90 may reduce vibration. The bushing 90 may be located on the power transmission shaft 640. In this embodiment, the bushing 90 may be located at the center of gravity of the watering housing 800. Since the bushing 90 is located at the center of gravity of the watering housing 800, the bushing 90 can significantly reduce the vibration of the watering housing 800 during the rotation.

The bushing 90 may be located higher than the full water level of the water tank 30. The bushing 90 may be located higher than the pump groove 810.

The bushing 90 and the power transmission shaft 640 may be assembled by a fitting method. The bushing 90 may be supported by the power transmission shaft 640.

In order to support the bushing 90, the power transmission shaft 640 may include a shaft support end 642. The diameter at the upper side may be smaller than the diameter at the lower side based on the shaft support end 642.

The bushing 90 may be inserted through the upper end of the power transmission shaft 640.

In order to minimize abrasion, the shaft support end 642 may be formed into tapered, chamfered or rounded shape. When the shaft support end 642 is formed into a right-angled shape, abrasion may occur during the assembling process or the operation process.

When the shaft support end 642 is abraded, the bushing 90 may move, thereby causing vibration. Also, the shaft support end 642 is abraded, the bushing 90 may incline or move, and thus misalignment with the power transmission shaft 640 may occur. Also, when misalignment between the bushing 90 and the power transmission shaft 640, eccentricity may occur during rotation, and thus vibration may occur.

A bushing support end 92 supported by the shaft support end 642 may be formed in the bushing axis hollow 91. The bushing axis hollow 91 may have a smaller diameter at an upper side thereof, and may have a larger diameter at a lower side thereof, based on the bushing support end 92.

In this embodiment, the shaft support end 642 and the bushing support end 92 may be configured to correspond to each other at one point. Unlike this embodiment, the shaft support end 642 and the bushing support end 92 may be formed at two or more points. In this case, the shaft support end 642 may be disposed in plurality in a longitudinal direction of the power transmission shaft 640, and the bushing support end 92 may also be disposed in plurality in a longitudinal direction of the bushing axis hollow 91.

In this embodiment, although the shaft support end 642 and the bushing support end 92 are disposed at a central portion, this may be irrelevant to the location and function of the shaft support end 642 and the bushing support end 92. For example, the shaft support end 642 and the bushing support end 92 may be disposed at an upper portion or a lower portion of the bushing axis hollow 91.

A shaft stopping surface 645 may be disposed on the power transmission shaft 640 to mutually interfere with the bushing 90 during the rotation of the power transmission shaft 640. The shaft stopping surface 645 may be formed on the outer circumferential surface of the power transmission shaft 640, and may be formed in a vertical direction. The shaft stopping surface 645 may be connected to the shaft support end 642. In this embodiment, the shaft support end 642 may be disposed over the shaft stopping surface 645.

The bushing 90 may include a bushing stopping surface 95 formed to correspond to the shaft stopping surface 645. The bushing stopping surface 95 may be a surface that forms the bushing axis hollow 91. In this embodiment, the shaft stopping surface 645 and the bushing stopping surface 95 may be disposed in plurality. Unlike this embodiment, the shaft stopping surface 645 and the bushing stopping surface 95 may be disposed only at one point.

The mutual interference between the shaft stopping surface 645 and the bushing stopping surface 95 and the mutual interference between the shaft support end 642 and the bushing support end 92 may be an alignment unit for aligning the bushing 90.

The mutual interference between the shaft stopping surface 645 and the bushing stopping surface 95 may provide an alignment function in a vertical direction. The mutual interference between the shaft support end 642 and the bushing support end 92 may provide an alignment function in a horizontal direction.

The mutual interference between the shaft support end 642 and the bushing support end 92 and the mutual interference between the shaft stopping surface 645 and the bushing stopping surface 95 may provide alignment functions in different directions.

Since the alignment unit provides alignment in plural directions, the bushing 90 may be more accurately installed, and the defective assembly can be minimized.

The watering housing cover 860 may be coupled to the upper side of the second watering housing 840, and may seal the upper side of the second watering housing 840. The watering housing cover 860 may be coupled to the second watering housing 840 by screw coupling.

In this embodiment, the watering housing cover 860 may be assembled with power transmission module 600. Unlike this embodiment, the watering housing cover 860 may be separated from the power transmission module 600. When the watering housing cover 860 is coupled to the power transmission shaft 640, the eccentricity and vibration of the watering housing 800 can be more effectively reduced.

The watering housing cover 860 may include a cover body 862 covering the upper opening of the second watering housing 840, a cover body border 863 downwardly extending from the cover body 862 and covering the upper end of the second watering housing 840, a packing installation rib 864 disposed under the cover body 862 and spaced from the cover body border 863 by a certain gap, a shaft fixing part 866 fixed to the power transmission shaft 640, and a reinforcing rib 868 connecting the shaft fixing part 866 and the packing installation rib 864.

When viewed from top, the cover body 862 may have a circular shape. The diameter of the cover body 862 may be larger than the diameter of the second watering housing 840.

The cover body border 863 may form the edge of the cover body 862. The cover body border 863 may be formed in a ring shape, and may be manufactured integrally with the cover body 862. The cover body border 863 may have a plurality of protrusions 861 formed on the outer surface thereof, and the protrusions 861 may be formed along the circumferential direction of 360 degrees of a circumference thereof. The protrusion 861 may provide a grip feeling for a user when the watering housing cover 860 is separated.

The packing installation rib 864 may be located inside the cover body border 863, and may be spaced from the cover body border 863 by a certain distance. A second packing 865 may be disposed between the cover body border 863 and the packing installation rib 864.

The second packing 865 may seal a gap between the watering housing cover 860 and the second watering housing 840.

The cover body border 863 and the second watering housing 840 may be screw-coupled. In this embodiment, the watering housing cover 860 and the second watering housing 840 may be assembled through tight fitting.

The shaft fixing part 866 may be assembled with the power transmission shaft 640, and may receive a torque from the power transmission shaft 640.

The shaft fixing part 866 and the power transmission shaft may be screw-coupled. For this, a screw thread 643 for screw coupling with the watering housing cover 860 may be formed on the outer circumferential surface of the upper end of the power transmission shaft 640.

A screw thread for assembling with the power transmission shaft 640 may be formed on the shaft fixing part 866. In this embodiment, a shaft fixing member 867 may be disposed on shaft fixing part 866, and the shaft fixing member 867 may be integrally double injection-molded on the shaft fixing part 866. In this embodiment, a nut may be used for the shaft fixing member 867.

Unlike the watering housing cover 860, the shaft fixing member 867 may be formed of a metallic material. Since the power transmission shaft 640 is formed of a metallic material, a part screw-coupled to the power transmission shaft 640 also needs to be formed of a metallic material to prevent abrasion or damage during coupling. When the whole of the watering housing cover 860 is formed of a metallic material, or when the shaft fixing part 866 is formed of a metallic material, it may be desirable to form a screw thread on the shaft fixing part 866 itself.

The watering housing cover 860 may have a diameter larger than the diameter of the second watering housing 840. When viewed from upper side, only the watering housing cover 860 may be exposed, and the second watering housing 840 and the first watering housing 820 may not be exposed.

Accordingly, at least a portion of water supplied to the water supply flow passage 109 may drop down on the watering housing cover 860. When the watering housing 800 rotates, water dropping on the watering housing cover 860 may be outwardly scattered from the surface of the watering housing cover 860 in a radiation direction.

The rotating watering housing cover 860 may spray supplied waster along the rotation direction, and an effect as if water drops from an umbrella can be achieved. Particularly, water drops may be broken away from the plurality of protrusions 861 which are disposed in a circumferential direction of the watering housing cover 860.

Figure 33:
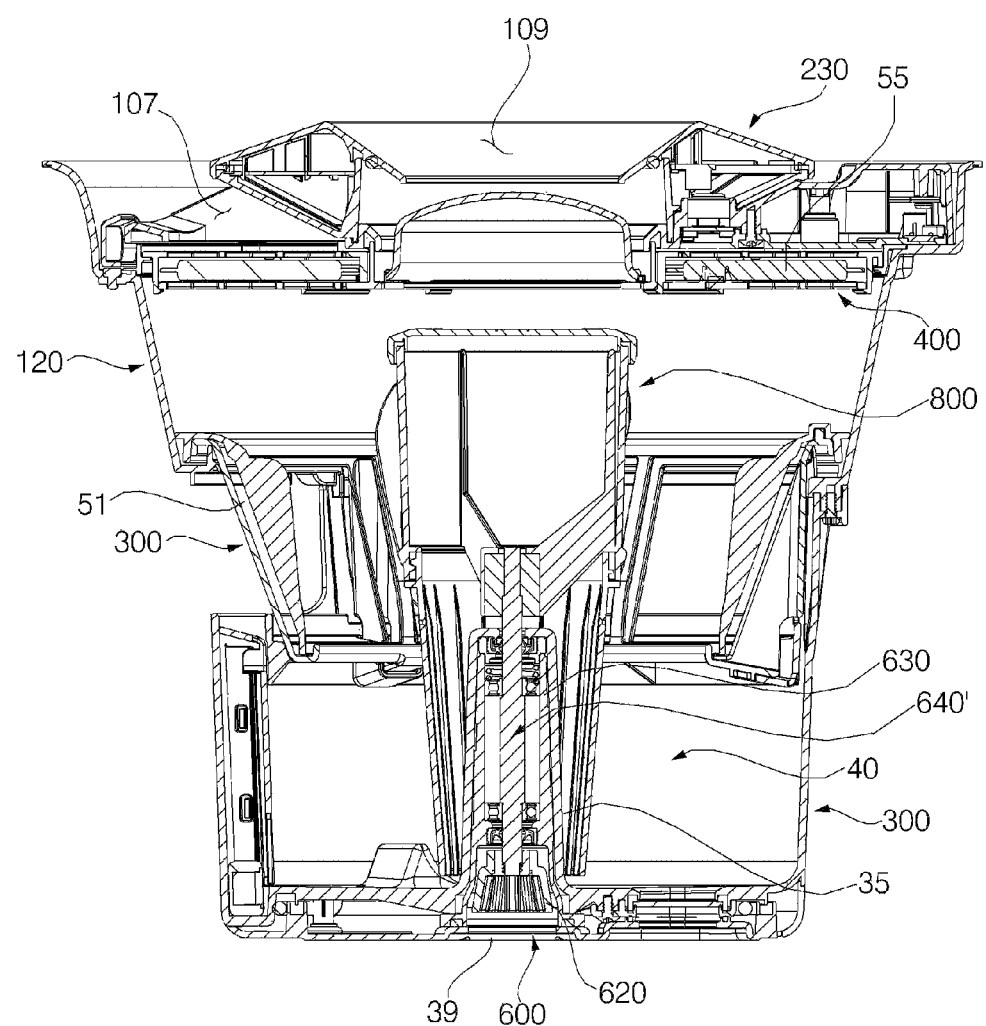
FIG. 33 is a cross-sectional view illustrating a power transmission module according to a second embodiment of the present invention.

FIG. 33 is a cross-sectional view illustrating a power transmission module according to a second embodiment of the present invention.

In the power transmission module according to this embodiment, a power transmission shaft 640' may be coupled to the watering housing 800 at only one point unlike the first embodiment.

In this embodiment, the power transmission shaft 640' may be coupled to only the bushing 90, and may not be coupled to the watering housing cover 860. The power transmission shaft 640' may deliver a torque to the bushing 90, and may rotate together with the watering housing 800.

Hereinafter, since other components are identical to those of the first embodiment, a detailed description thereof will be omitted herein.

Figure 34:
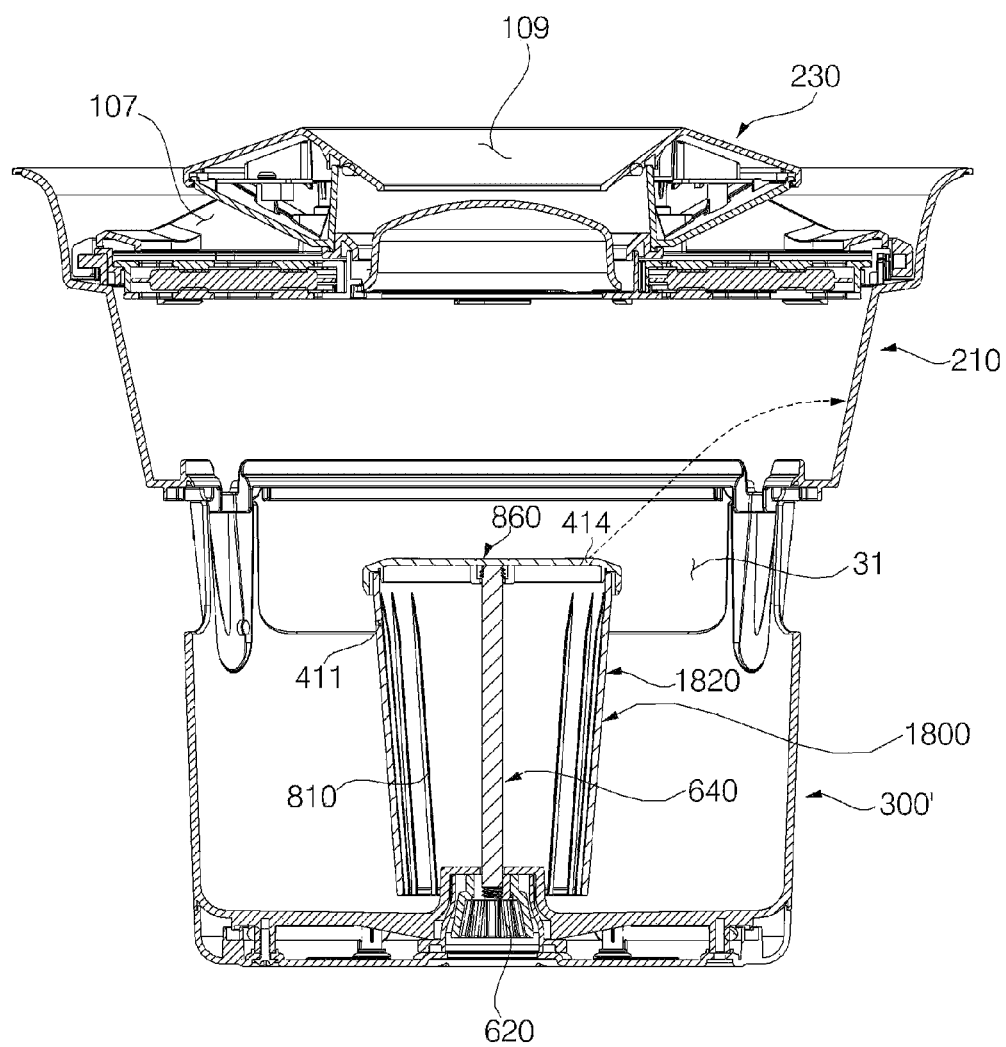
FIG. 34 is a cross-sectional view illustrating a watering unit according to a third embodiment of the present invention.

FIG. 34 is a cross-sectional view illustrating a watering unit according to a third embodiment of the present invention.

A watering unit 40 according to this embodiment may include a first watering housing 1820 and a watering housing cover 860. The watering housing 1800 according to this embodiment may have a length shorter than that of the first embodiment.

In this embodiment, the power transmission module may include a first coupler, a second coupler, and a power transmission shaft 640.

Since the height of the watering housing 1800 is small, components such as a bushing, a power transmission housing and a bearing may not be needed to reduce vibration. Since a power transmission housing is not provided, a water tank 30' may not include a column.

The power transmission shaft 640 may be coupled to the second coupler 620 and the watering housing cover 860.

Also, a nozzle 414 may be disposed in the watering housing cover 860. The nozzle 414 may be formed to incline to the upper side. The nozzle 414 may upwardly spray water that is pumped.

Water sprayed from the nozzle 414 may collide with the inner side surface of the visual body 210.

Hereinafter, since other components are identical to those of the first embodiment, a detailed description thereof will be omitted herein.

Figure 35:
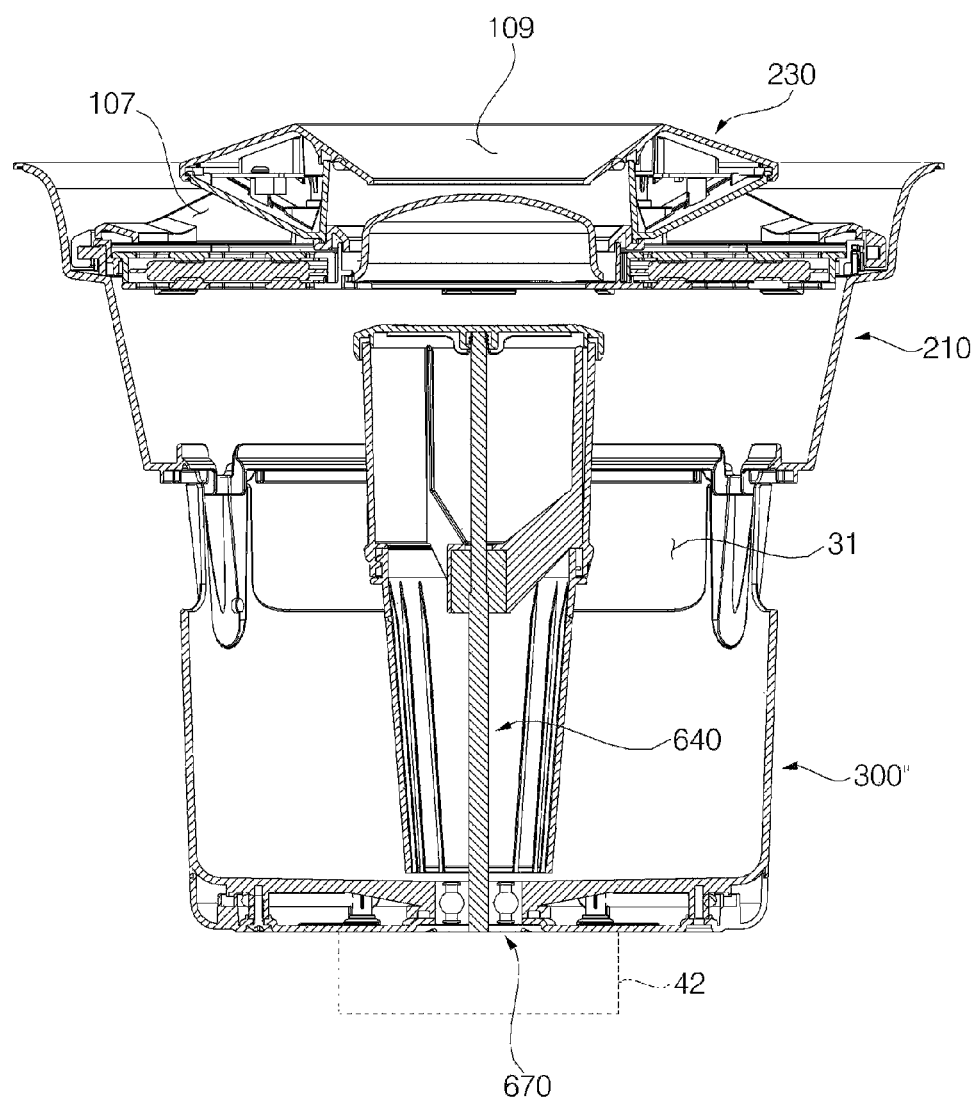
FIG. 35 is a cross-sectional view illustrating a watering unit according to a fourth embodiment of the present invention.

FIG. 35 is a cross-sectional view illustrating a watering unit according to a fourth embodiment of the present invention.

Unlike the first embodiment, the water unit according to this embodiment may not include a column and a power transmission housing. The power transmission module according to this embodiment may include a power transmission shaft 640 and a bushing 90.

Particularly, the power transmission shaft 640 and the watering motor 42 may be directed connected, and couplers may not be provided.

A bearing 670 may be disposed on the bottom of a water tank 30", and the power transmission shaft 640 may penetrate the bearing 670 to be coupled to the watering housing 800.

The water tank 30" according to this embodiment may not also include a column.

Hereinafter, since other components are identical to those of the first embodiment, a detailed description thereof will be omitted herein.

A humidification and air cleaning apparatus according to an exemplary embodiment of the present invention has at least one of the following effects.

First, the watering housing can be rotated through the power transmission shaft disposed inside the watering housing.

Second, even though the watering housing longitudinally extends in a vertical direction, since the power transmission shaft is coupled to two points of the watering housing, eccentricity and vibration of the watering housing can be minimized.

Third, even though the watering housing longitudinally extends in a vertical direction, since the bushing is disposed on the power transmission shaft, eccentricity and vibration of the watering housing can be minimized.

Fourth, since the bushing is located higher than the full water level of the water tank, the bushing is not soaked in water, and eccentricity and vibration of the watering housing can be minimized.

Fifth, since the power transmission housing is fixed to the water tank and since the power transmission shaft rotates while being supported by the power transmission housing, eccentricity and vibration of the watering housing can be minimized.

Sixth, since the column is formed in the water tank and since the power transmission housing is disposed inside the column, a contact between water of the water tank and the power transmission housing can be minimized.

The effects of the present invention are not limited to the above; other effects that are not described herein will be clearly understood by the persons skilled in the art from the following claims.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A humidification and air cleaning apparatus comprising:
    a water tank to store water, the water tank having a bottom wall and a side wall extending upward from the bottom wall;
    a watering housing disposed inside the water tank;
    a watering motor to generate a torque; and
    a power transmission shaft disposed inside the watering housing to deliver a torque of the watering motor to the watering housing,
    wherein the watering housing comprises a bottom surface that is opened and a lower end that is spaced from the bottom wall of the water tank by a suction gap, and
    wherein the power transmission shaft penetrates the bottom wall of the water tank.

2. The humidification and air cleaning apparatus of claim 1, wherein the watering housing further comprises a watering connection part disposed inside therein and protruding inward, wherein the power transmission shaft is coupled to the watering connection part to deliver a torque.

3. The humidification and air cleaning apparatus of claim 1, further comprising a bushing installed at the power transmission shaft, wherein the bushing is formed of a metallic material.

4. The humidification and air cleaning apparatus of claim 3, wherein the bushing is located higher than a full water level of the water tank.

5. The humidification and air cleaning apparatus of claim 1, wherein:
    the water tank further comprises a column disposed inside the watering housing,
    the column upwardly protrudes inside the watering housing, and
    the power transmission shaft penetrates the column to be coupled to the watering housing.

6. The humidification and air cleaning apparatus of claim 5, further comprising a power transmission housing disposed inside the column,
    wherein:
    the power transmission housing is supported inside the column,
    the power transmission housing has a hollow that the power transmission shaft penetrates, and
    the power transmission shaft penetrates the power transmission housing and the column to be coupled to the watering housing.

7. The humidification and air cleaning apparatus of claim 6, further comprising a bearing disposed inside the power transmission housing, wherein the power transmission shaft penetrates the bearing.

8. The humidification and air cleaning apparatus of claim 6, further comprising a shaft gasket disposed inside the power transmission housing, wherein the shaft gasket seals the hollow, and the power transmission shaft penetrates the shaft gasket.

9. The humidification and air cleaning apparatus of claim 6, wherein the power transmission housing is fixed to the water tank.

10. The humidification and air cleaning apparatus of claim 1, wherein the watering housing comprises:
    a first watering housing spaced apart from an undersurface of an inner side of the water tank by a suction gap and having upper and a lower sides thereof opened, respectively;
    a second watering housing having upper and lower sides opened, assembled with an upper end of the first watering housing;

a watering housing cover coupled with an upper end of the second watering housing to cover an upper of the second watering housing; and a power transmission unit disposed in at least one of the first watering housing, the second watering housing and the watering housing cover to receive a torque from the watering motor, wherein the power transmission shaft is coupled to the power transmission unit.

11. The humidification and air cleaning apparatus of claim 10, wherein the power transmission shaft has an upper end thereof coupled to the watering housing cover.

12. The humidification and air cleaning apparatus of claim 10, further comprising a bushing installed at the power transmission unit, wherein the power transmission shaft penetrates the bushing to be coupled, and the power transmission shaft has an upper end thereof coupled to the watering housing cover.

13. The humidification and air cleaning apparatus of claim 10, further comprising a column upwardly protruding from a bottom of the water tank, wherein the power transmission shaft penetrates the column to be coupled to the watering housing, and the column is disposed under the power transmission unit.

14. The humidification and air cleaning apparatus of claim 13, further comprising a power transmission housing disposed inside the column, wherein the power transmission housing comprises:

a bearing housing having upper and lower sides thereof opened;

a housing cap coupled to an upper side of the bearing housing, wherein the power transmission shaft penetrates through the housing cap in a vertical direction;

a shaft gasket disposed between the housing cap and the power transmission shaft and fixed to the housing cap; and a housing elastic member disposed between the bearing housing and the housing cap to provide an elastic force.

* * * * *